United States Patent
Prohaska

(10) Patent No.: US 9,591,811 B2
(45) Date of Patent: Mar. 14, 2017

(54) MOBILE TREE-TRIMMING APPARATUS

(75) Inventor: James Prohaska, Prior Lake, MN (US)

(73) Assignee: Jarraff Industries, Inc., St. Peter, MN (US)

( * ) Notice: Subject to any disclaimer, the term of this patent is extended or adjusted under 35 U.S.C. 154(b) by 515 days.

(21) Appl. No.: 13/819,844

(22) PCT Filed: Jun. 24, 2011

(86) PCT No.: PCT/US2011/041790
§ 371 (c)(1),
(2), (4) Date: Feb. 28, 2013

(87) PCT Pub. No.: WO2012/177261
PCT Pub. Date: Dec. 27, 2012

(65) Prior Publication Data
US 2014/0096401 A1 Apr. 10, 2014

(51) Int. Cl.
| | | |
|---|---|---|
| *A01G 23/095* | (2006.01) | |
| *A01G 3/08* | (2006.01) | |
| *B27B 5/10* | (2006.01) | |
| *B23D 45/00* | (2006.01) | |
| *B27B 9/00* | (2006.01) | |

(52) U.S. Cl.
CPC .......... *A01G 23/095* (2013.01); *A01G 3/088* (2013.01); *B23D 45/003* (2013.01); *B27B 5/10* (2013.01); *B27B 9/00* (2013.01); *Y10T 83/95* (2015.04)

(58) Field of Classification Search
CPC .. A01G 23/083; A01G 23/095; A01G 23/097; B27B 5/10; B27B 11/12
See application file for complete search history.

(56) References Cited

U.S. PATENT DOCUMENTS

| 3,530,769 A | 9/1970 | Gurevich | |
|---|---|---|---|
| 3,572,746 A | 3/1971 | Mueller | |
| 3,899,037 A * | 8/1975 | Yuker | B60G 17/01925 180/41 |
| 3,913,304 A | 10/1975 | Jodoin | |
| 4,411,070 A | 10/1983 | Boyum et al. | |
| 4,679,336 A * | 7/1987 | Brocklebank | E02F 3/30 212/197 |

(Continued)

FOREIGN PATENT DOCUMENTS

| CA | 1161797 | 2/1984 |
|---|---|---|
| EP | 0318805 | 6/1989 |

OTHER PUBLICATIONS

"Brand New SkyTrim Units," www.kwtruckequipment.com/skytrim.htm, last accessed Aug. 25, 2010.

(Continued)

*Primary Examiner* — Matthew G Katcoff
(74) *Attorney, Agent, or Firm* — Haugen Law Firm PLLP

(57) ABSTRACT

An apparatus, such as for tree trimming, includes a mobile carriage having a frame and a pedestal supported by the frame. The apparatus further includes a boom, such as a telescoping boom that is secured to the pedestal through a boom support. The pedestal is pivotable with respect to the carriage frame so that the boom may be selectively operated in a variety of orientations. The mobile carriage of the apparatus is sufficiently compact to fit though tight openings, while also being capable of stably supporting boom extension for operation of a distal end of the boom at elevated heights.

13 Claims, 14 Drawing Sheets

(56) References Cited

U.S. PATENT DOCUMENTS

| | | | |
|---|---|---|---|
| 4,823,852 A | 4/1989 | Langford | |
| 4,987,825 A | 1/1991 | Weyer | |
| 5,337,847 A | 8/1994 | Woods et al. | |
| 5,447,095 A | 9/1995 | Weyer | |
| 5,489,114 A | 2/1996 | Ward et al. | |
| 5,501,257 A | 3/1996 | Hickman | |
| 6,604,796 B2 | 8/2003 | Boyum | |
| 6,641,235 B2 | 11/2003 | Boyum | |
| 7,367,368 B2 | 5/2008 | Smitherman | |
| 7,753,382 B2 | 7/2010 | Choi | |
| 2008/0196790 A1* | 8/2008 | Fargeot | A01G 23/095 144/4.1 |
| 2009/0118913 A1* | 5/2009 | O'Halloran | B60G 17/0165 701/50 |
| 2009/0314566 A1* | 12/2009 | Rust | B62D 33/067 180/89.14 |
| 2012/0279614 A1 | 11/2012 | Terrell | |

OTHER PUBLICATIONS

News.com.au, "Neal's Monster Tree Trimmer", http://www/weeklytimesnow.com.au/article/2009/12/23/144051<machine.html, last accessed Aug. 25, 2010.
Skylift. "Skylift Mini-Arborist", http://www.skyliftus.com/mini-arborist.php, last accessed Aug. 25, 2010.
TSE International, Inc., "TR700-70ft Track Mounted Tree Trimmer—'The Cajun Cutter'". http://www.tse-international.com/catalogue.php?category_id=1952&object_id=37043. Last accessed Aug. 25, 2010.
Skylift. "Skylift Mini-Arborist 39" http://www.skyliftus.com/Product%20Info/MA39.pdf, last accessed Aug. 25, 2010.

* cited by examiner

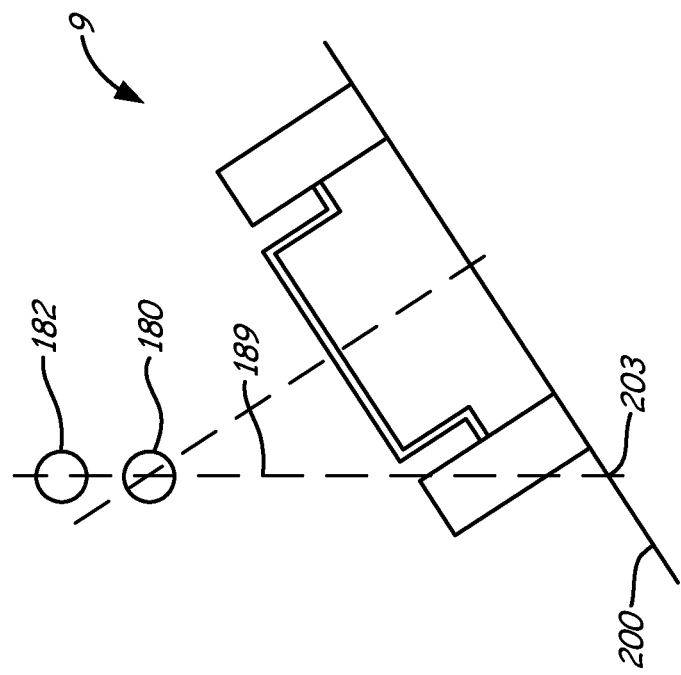
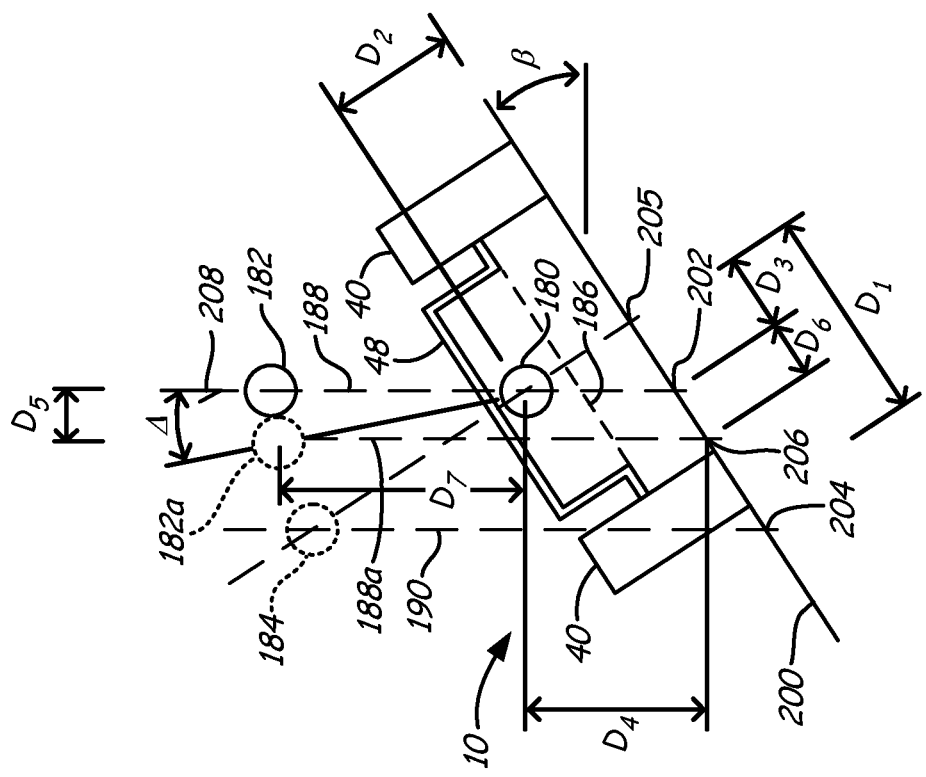
*Fig. 8B* (PRIOR ART)
*Fig. 8A*

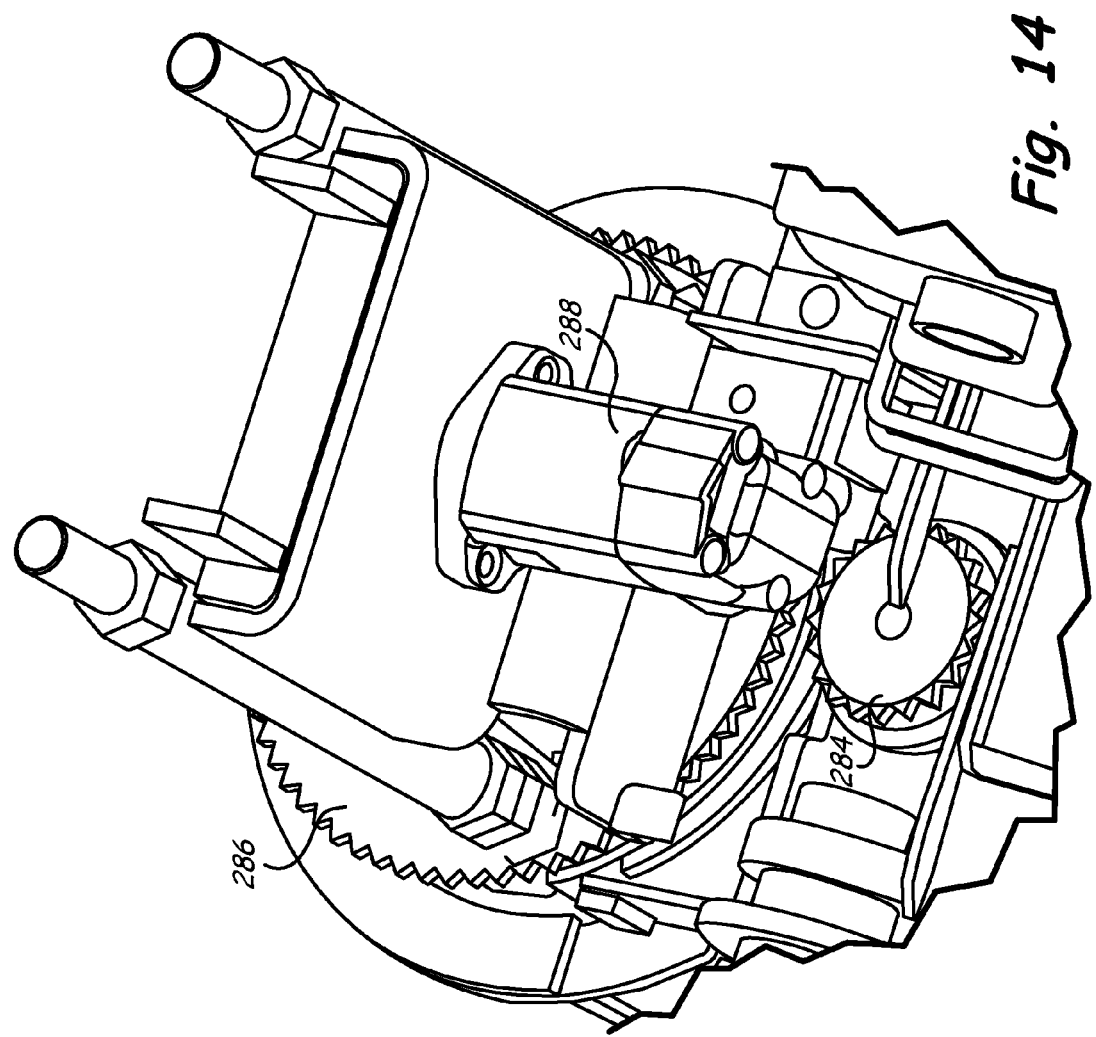

MOBILE TREE-TRIMMING APPARATUS

FIELD OF THE INVENTION

The present invention relates to mobile lift apparatus generally, and more particularly to compact mobile tree-trimming apparatus with the capability of relatively long-reach tree trimming from a compact and mobile carriage base.

BACKGROUND OF THE INVENTION

A variety of tree-trimming apparatus have been developed for clearing tree branches and other vegetation, particularly that which is difficult to reach with conventional hand-held equipment. One approach has utilized a person-carrying bucket that is raised by means of a boom to the area of unwanted growth. The vegetation is then cut by hand or power saw by the person or people in the raised bucket. Such an operation, however, may present dangers to the workers in the form of falling tree branches and electrocution in the event that vegetation is being trimmed from an area near active power lines. In addition, raised bucket systems typically have limited range when the person-carrying bucket is in the lifted operating condition. As a result, elevated vegetation-cutting operations often require multiple movements of the base vehicle, which cannot be safely accomplished while the person is positioned in the elevated bucket. Consequently, each movement of the base vehicle must be preceded by a lowering of the bucket to its storage and travel position, which substantially increases the time required for completing a tree-trimming project.

Other devices have been proposed which alleviate some of the drawbacks of bucket lift systems. For example, machines employing retractable/extendable booms have been implemented with a remotely-operated cutting device on the end of the boom. The boom device is mounted on a vehicle to enhance the cutting apparatus mobility. Some of such conventional devices, however, have limited reach and stability rendering such cutting apparatus ineffective in clearing vegetation from high locations. Certain models with extended boom reach require the use of outriggers mounted on the sides of the vehicle to stabilize the apparatus from tipping due to the large weight and relatively high center of gravity introduced by relatively long booms. Because the stabilizing outriggers must be accurately re-positioned each time the vehicle is moved, overall project time is substantially increased, reducing the efficiency of apparatus requiring stabilizing outriggers to level and establish a stable vehicle for support of the cutting boom.

Many of the drawbacks of conventional tree-trimming apparatus were resolved in the system described in U.S. Pat. No. 4,411,070, herein incorporated by reference. The apparatus of the '070 patent provides an efficient tree-trimming system utilizing a telescopic and pivotal boom for enhanced mobility of the cutting device secured at the end of the boom. In addition to the extensibility of the device of the '070 patent, the boom is constructed from a light-weight electrically nonconductive flexible material such as fiberglass. Such construction is lightweight and allows the tree trimming apparatus to be used without the necessity of outriggers mounted on the vehicle for stabilization. The electrically nonconductive boom also provides a safer working environment for the operator, since there is no conductive path between the end of the boom and the operator.

While the apparatus of the '070 patent has proven to be an effective tree-trimming system, a need has emerged for trimming vegetation that is inaccessible to large vehicles. Examples include vegetation surrounding power lines that are not located along a roadway, and residential applications in which elevated vegetation cutting is required but not accessible by the vehicles which support conventional extended-boom cutting devices. Efforts have been made to substantially reduce the size of the support vehicle, to, for example, facilitate passage through a residential gate opening (e.g. 36 inch wide opening). However, the reduction in size of the support vehicle correspondingly reduces the stability of the support vehicle when elevated cutting operations are commenced. The standard approach to address such instability is the use of outriggers, as described above. Such outriggers, as also described above, however, limit the ease of mobility of such apparatus, and substantially reduce the efficiency of operation because the outriggers must be carefully (and oftentimes manually) positioned at each cutting area. Because typical projects involve several distinct cutting areas, conventional systems require multiple setups and repositioning of outriggers, which consumes substantial time resources.

In view of the above, therefore, it is an object of the present invention to provide a compact mobile tree-trimming apparatus which does not require the use of outriggers while nevertheless providing a stable and mobile base for supporting extended boom cutting operations.

It is a further object of the present invention to provide a mobile tree-trimming apparatus that is sufficiently compact to be useful in confined spaces, including by passing through conventional residential gate openings of 36 inches.

It is a still further object of the present invention to provide a mobile tree trimming apparatus which may be remotely operated from a safe distance.

It is yet another object of the present invention to provide a compact mobile tree trimming apparatus that is capable of operating from uneven and inclined ground surfaces.

SUMMARY OF THE INVENTION

By means of the present invention, elevated operations, such as tree trimming procedures, may be accomplished in an efficient manner. In particular, such operations may be accomplished in locations unreachable by many conventional cutting apparatus, and without the need for stabilizing outriggers. Consequently, such elevated operations may be performed quickly and safely.

In one embodiment, the mobile apparatus includes a mobile carriage having a frame and wheels secured to the carriage for motivating the carriage along a ground surface, the carriage defining a footprint and a center line bisecting the footprint into a first side including a first perimeter boundary, and a second side including a second perimeter boundary. A first width dimension of the footprint is measured from the center line to one of the first and second perimeter boundaries, and a second width dimension is measured from the first perimeter boundary to the second perimeter boundary through a first intersection point. A pedestal of the mobile apparatus is supported by the frame, and is pivotable about first and second substantially horizontal orthogonal axes crossing at a pivot line vertically extending through the first and second axes and intersecting the ground surface at the first intersection point. An uppermost one of the first and second axes at the pivot line defines a pivot location that is perpendicularly spaced from the ground surface by a first dimension. The apparatus further includes a first pivot mechanism for selectively pivoting the pedestal about the first substantially horizontal axis, and a second pivot mechanism for selectively pivoting the pedestal about the second substantially horizontal axis. A boom support is secured to the pedestal, and the boom having a proximal end and a distal end is secured to the boom support. The apparatus further includes a first center of gravity location of mass pivoted by the first and second pivot mechanisms. The first center of gravity location is acted upon by gravity along a first gravitational axis having a second intersection point with the ground surface. The second intersection point moves in coordination with the selective pivoting of the first and second pivot mechanisms so as to be selectively spaced from the center line by a second dimension. The apparatus includes a first control system for automatically operating the first and second pivot mechanisms to maintain the center of gravity location in an adjustable position through which the first gravitational axis extends such that the first gravitational axis passes within a third dimension of the pivot location. The third dimension is limited by a tolerance angle of the first control system of maintaining the center of gravity location gravitationally above the pivot location while the carriage is operated on the ground surface having an angle of inclination. The apparatus is arranged such that:

$D_4 \times \sin(\beta) + D_6 < D_1$, wherein $D_1$=first width dimension
$D_4$=square root of $(D_2^2 + D_3^2)$
$D_2$=first dimension
$D_3$=second dimension
$\beta$=angle of inclination of the ground surface
$D_6 = D_5 \div \cos(\beta)$
$D_5 = D_7 \times \sin(\delta)$
$D_7$=second width dimension
$\Delta$=tolerance angle.

In another embodiment, the tree rimming apparatus of the present invention includes a mobile carriage having a frame and a pedestal supported by the frame, wherein the pedestal is pivotable about first and second substantially horizontal axes, with the first and second axes located below a substantially horizontal plane containing an upper surface of the frame. The tree trimming apparatus further includes a first pivot mechanism for selectively pivoting the pedestal about the first substantially horizontal axis, and a second pivot mechanism for selectively pivoting the pedestal about the second substantially horizontal axis. A boom support may be secured to the pedestal, and a boom having a proximal end and a distal end is secured to the boom support. A cutting apparatus may be secured to the distal end of the boom.

In a further embodiment, a tree trimming apparatus of the present invention includes a mobile carriage having a frame and wheel arms secured to the frame, wherein the wheel arms support driving mechanisms for motivating the mobile carriage. The driving mechanisms are drivably secured to respective distal ends of the wheel arms, and at least some of the wheel arms are selectively movable between a first closed position and a second open position. The frame, the wheel arms, and the driving mechanisms together define a footprint for the mobile carriage, with the footprint having a first length and a first width for the first closed position, and a second length and a second width for the second open position. The first width may be no greater than about 35 in. The apparatus further includes a pedestal supported by the frame, wherein the pedestal is selectively pivotal about first and second substantially horizontal axes. A boom support may be rotatably secured to the pedestal for selective rotation about a substantially vertically central axis of the pedestal. A boom having a proximal end and a distal end may be secured to the boom support, and a cutting apparatus may be secured to the distal end of the boom.

Another tree trimming apparatus of the present invention includes a mobile carriage having a frame, and a pedestal supported by the frame, wherein the pedestal is selectively pivotable about first and second substantially horizontal axes. A boom support may be rotatably secured to the pedestal for selective rotation about a substantially vertical central axis of the pedestal. A boom having a proximal portion and a distal portion may be secured to the boom support, and a first motor coupled to the boom may be operated to selectively rotate the boom with respect to the boom support about a longitudinal axis of the boom. A cutting apparatus may further be secured to the distal end of the boom so as to rotate in unison with the boom about the longitudinal axis.

BRIEF DESCRIPTION OF THE DRAWINGS

FIG. 8a is a schematic diagram of a mobile apparatus of the present invention on an inclined surface;

FIG. 8b is a schematic diagram of a conventional apparatus on an inclined surface;

FIG. 14 is an enlarged view of a portion of the mobile apparatus illustrated in FIG. 1.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

For the purposes of describing the apparatus of the present invention, the terms "up", "down", "horizontal", "vertical", "above", "below", "proximal", "distal", or similar related terms will be used to describe the component parts of the apparatus and their relative positions. Such terms are used for convenience in reference to the attached drawing figures, with apparatus 10 being oriented with carriage 12 on a flat, horizontal, ground surface. Such terms should not be interpreted as limiting to the scope of the present invention.

Figure 1:
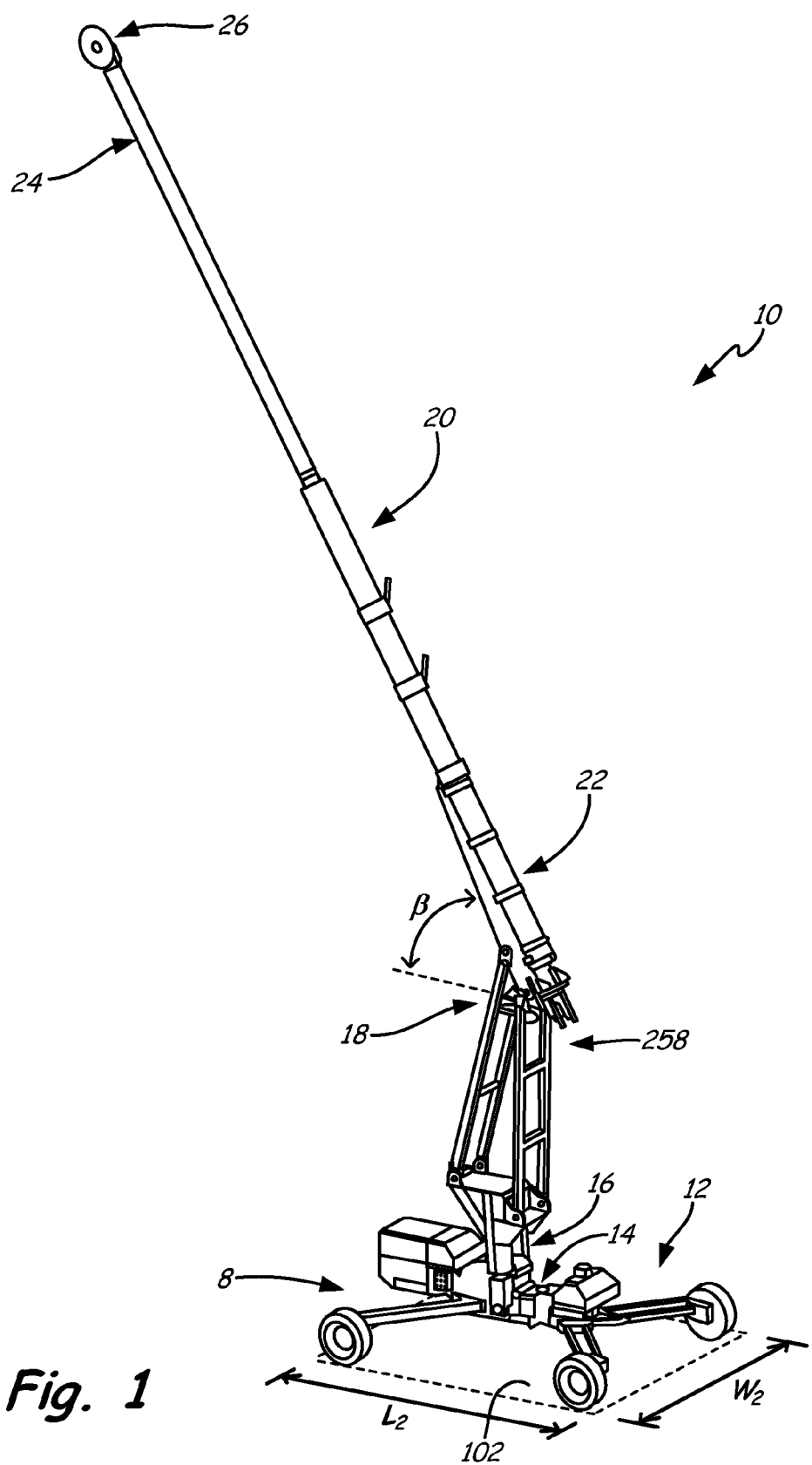
FIG. 1 is a view of a mobile apparatus of the present invention with wheel arms in an "open" position.

With reference to the drawing figures, and first to FIG. 1, a tree trimming apparatus 10 includes a mobile carriage 12 with a frame 14 that supports a pedestal 16 and a boom support 18. A boom 20 includes a proximal end 22 and a distal end 24. In some embodiments, proximal end 22 of boom 20 is secured to boom support 18. Apparatus 10 may further include a cutting apparatus 26 secured to boom 20. In the illustrated embodiment, distal end 24 of boom 20 and cutting apparatus 26 may be operably elevated substantially above carriage 12 by boom support 18.

As described above, apparatus 10 may be adapted to be selectively driven to locations at which cutting apparatus 26 may operably reach and cut vegetation. Such a procedure may be useful in, for example, right of way clearing for roadways and electrical power lines, storm damage repair and cleanup, and otherwise aesthetic vegetation removal, including residential "back-yard" applications. While apparatus 10 is described herein in terms of a tree trimming device, it is contemplated that apparatus 10 may be useful in a variety of other applications requiring stable elevation of boom 20. Such alternative applications include lift operations for lifting one or more persons in a bucket secured to boom 20, firefighting equipment, and other servicing equipment for servicing elevated positions such as elevated electrical power lines, window washing equipment, roofing equipment, and so on. Therefore, apparatus 10 should be considered as useful in applications other than tree trimming operations, wherein cutting apparatus 26 may be one of a variety of attachments to boom 20.

Apparatus 10 is illustrated in FIG. 1 in an operating condition, with boom 20 being supported in an inclined elevated orientation by boom support 18. Distal end 24 of boom 20 may be telescopically received in proximal end 22, such that distal end 24 may be selectively telescopically extended and retracted with respect to proximal end 22, as will be described in greater detail hereinbelow. Carriage 12 is also illustrated in FIG. 1 in an open condition to provide enhanced stability to apparatus 10 when boom 20 is in an elevated position. The functionality of carriage 12 to selectively attain such open position will also be described hereinbelow.

Figure 2:
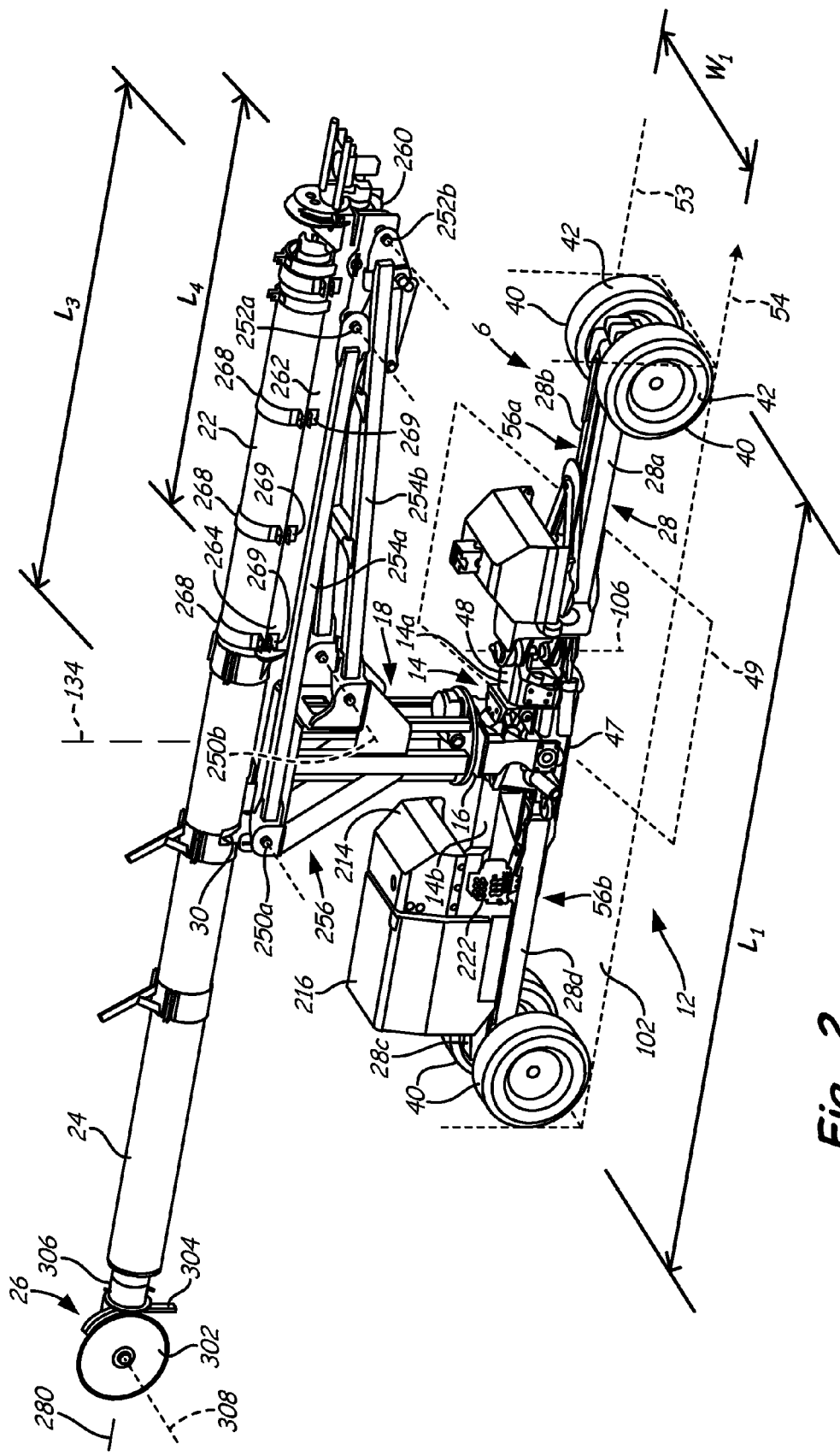
FIG. 2 is a view of a mobile apparatus of the present invention with wheel arms in a "closed" position.

FIG. 2 is a further illustration of apparatus 10 with carriage 12 being in a closed condition for stowage or transport in confined spaces. Boom 20 is illustrated in FIG. 2 in a retracted stowage position, in this embodiment resting upon cradle 30 of boom support 18. Boom 20 may typically be brought into the stowage position illustrated in FIG. 2 to lower the center of gravity of apparatus 10, thereby maximizing stability of apparatus 10, when carriage 12 is in a closed position. As indicated above, carriage 12 may be selectively adjusted into the closed position for storage of apparatus 10, as well as for transport of apparatus 10 and movement or transport in and through confined spaces. In one aspect of the present invention, apparatus 10 may be selectively adjusted to minimize its width profile in order to fit within and through confined spaces, such as a typical residential fence gate having a conventional opening of 36 inches. In this manner, a width dimension "$W_1$", as measured between respective outer surfaces 42 of driving mechanisms 40 is less than about 35 inches when carriage 12 is in a closed condition, as illustrated in FIG. 2. In some embodiments, width $W_1$ is associated with an entirety of apparatus 10, wherein a width profile of apparatus 10 is defined between respective vertical planes containing outer surfaces 42. In this manner, an entirety of apparatus 10 may fit within and through a width spacing of as little as about 36 inches. Apparatus 10 may therefore be driven within and through confined spaces such as residential fencing gates, alleys, property setbacks, and the like. Such a narrow width profile is therefore advantageous over conventional systems in being accessible to and through confined areas.

Frame 14 of carriage 12 may constitute a weight bearing structure to which is coupled pedestal 16 for supporting boom support 18 and boom 20. Wheel arms 28 may also be secured to frame 14, such that frame 14 serves as a structure through which all components of apparatus 10 are connected. In other words, frame 14 may unite the components of apparatus 10, which is supported on wheel arms 28, and which supports the remainder of apparatus 10.

As illustrated in FIG. 2, frame 14 includes a structure having a lower surface 47 and an upper surface 48. A substantially horizontal plane 49 contains upper surface 48 of frame 14.

Mobile carriage 12 further includes wheel arms 28 secured to frame 14, which wheel arms 28 support driving mechanisms 40 for motivating mobile carriage 12. In one embodiment, carriage 12 may include a plurality of distinct wheel arms, such as wheel arms 28a-28d, to connect driving mechanisms 40 to frame 14. In this particular embodiment, each of wheel arms 28a-28d secure a respective driving mechanism 40 to frame 14. It is to be understood, however, that the single wheel arm may be useful in securing a plurality of distinct driving mechanisms to frame 14 of carriage 12.

Figure 3:
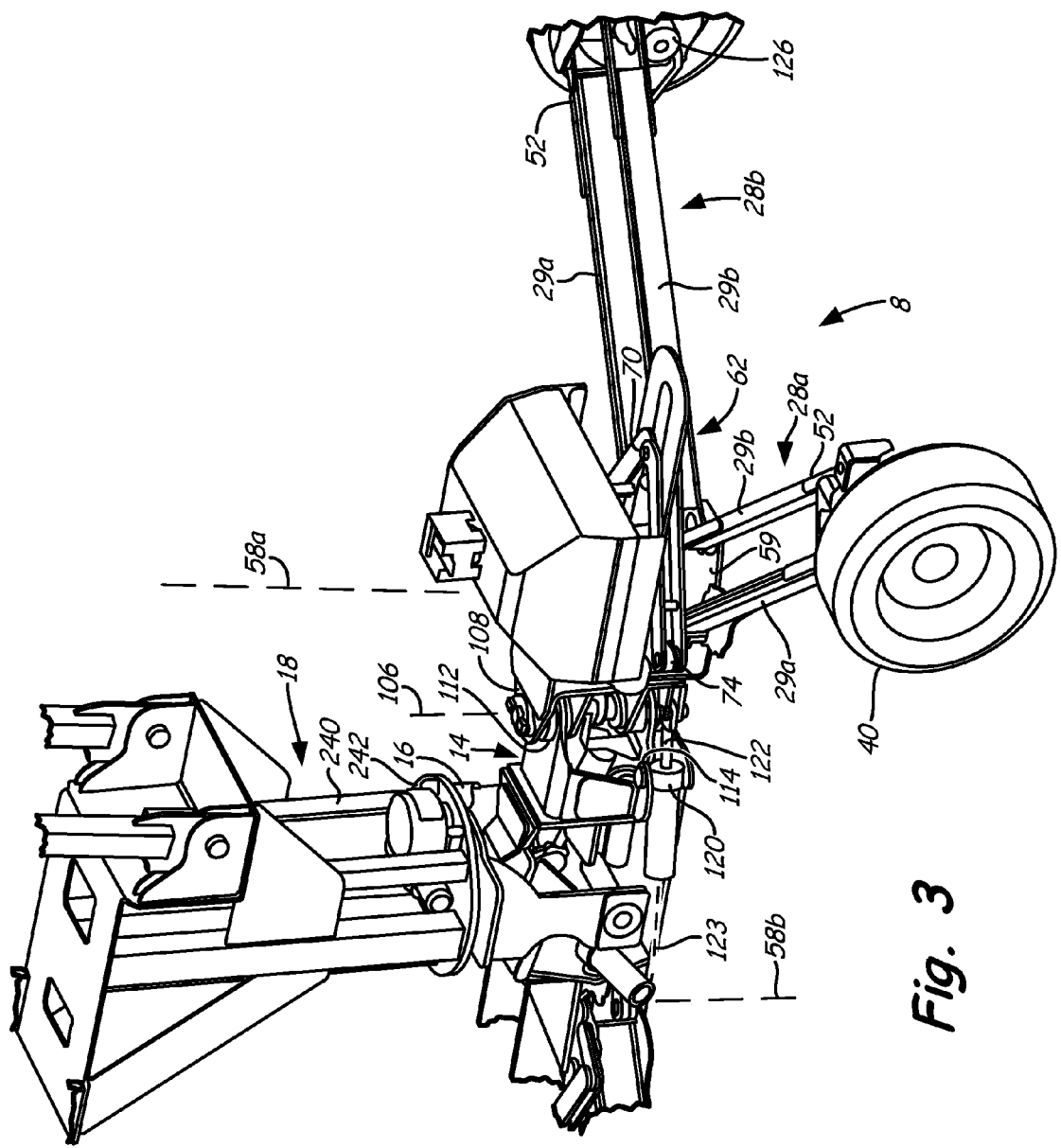
FIG. 3 is an upper perspective view of a portion of the mobile apparatus illustrated in FIG. 1.
Figure 4:
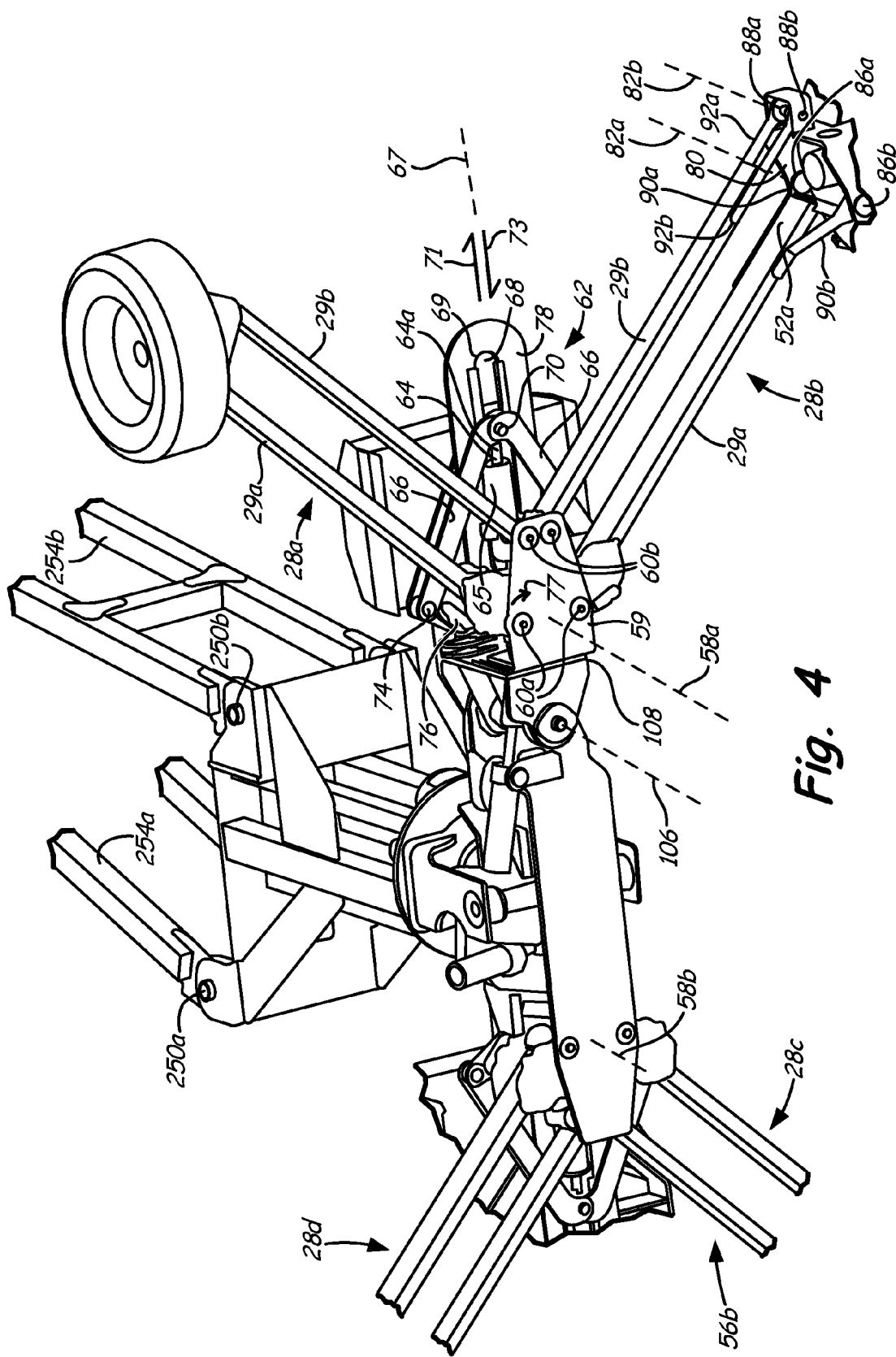
FIG. 4 is a bottom perspective view of a portion of the mobile apparatus illustrated in FIG. 1.
Figure 5:
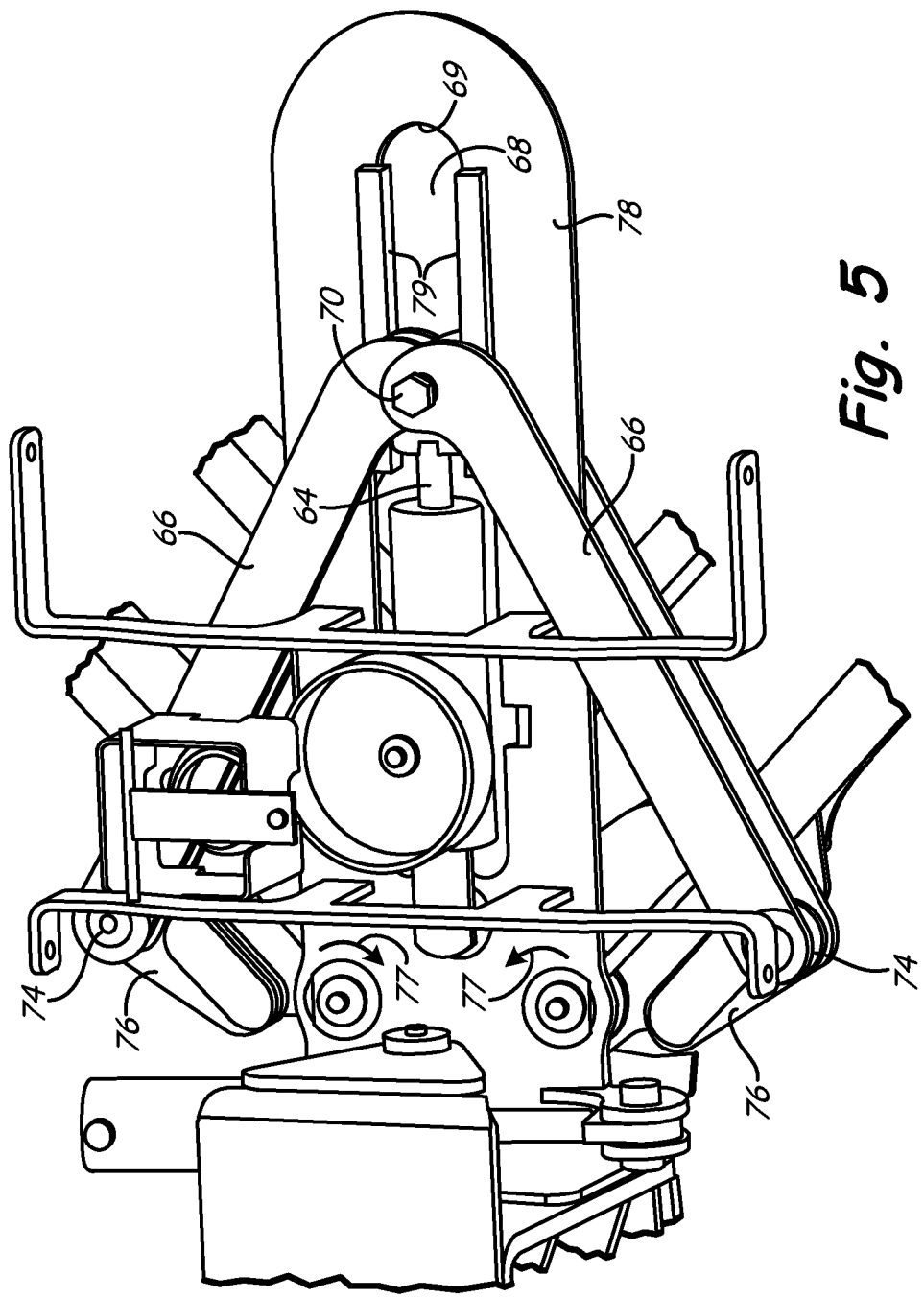
FIG. 5 is an enlarged view of a portion of the mobile apparatus illustrated in FIG. 4.

As illustrated in FIGS. 3 and 4, wheel arms 28a-28d may each comprise a plurality of struts, such as struts 29a, 29b. The provision of a plurality of struts 29a, 29b for each of wheel arms 28a-28d is an example mechanism for maintaining directionality of driving mechanism 40. While a number of coupling mechanisms are contemplated by the present invention to drivably secure driving mechanisms 40 to wheel arms 28a-28d, and correspondingly to frame 14, struts 29a, 29b of wheel arms 28a-28d pivot about respective pivot points in the selective movement of wheel arms 28a-28d between open and closed positions to maintain a directionality of the respective driving mechanism 40 drivably secured thereto. As described above, wheel arms 28 may be selectively adjusted anywhere between open and closed positions. In one embodiment, such adjustment may be performed through pivoting of wheel arms 28 about a substantially vertical axis. Were the driving mechanisms 40 to have a fixed orientational relationship to wheel arms 28, pivoting of wheel arms 28 about a substantially vertical axis near frame 14 would result in a modification of the directionality of driving mechanisms 40. For instance, without a pivot mechanism between driving mechanism 40 and distal end 52 of wheel arm 28, a driving mechanism 40 with a driving directionality vector 54 substantially parallel to a longitudinal axis 53 of carriage 12 when wheel arm 28 is in a closed position would exhibit a second directionality vector angularly skewed from directionality vector 54 when wheel arm 28 is adjusted out from its closed position. In the illustrated embodiment, respective sets 56a, 56b of wheel arms 28 operably pivot in opposite circumaxial directions about respective theoretical substantially vertical pivot axes 58a, 58b. The above-described hypothetical shift in directionality vectors of respective driving mechanisms 40 would render the mobility of carriage 12 inoperable. Consequently, a pivot mechanism at the junction between driving mechanisms 40 and respective wheel arms 28 is also provided in the present invention.

An example pivot mechanism for wheel arms 28 and driving mechanisms 40 will now be described with reference to the drawing figures. It is to be understood, however, that various movement mechanisms, including a variety of pivot mechanisms, may be employed to selectively adjust wheel arms between open and closed positions, as well as to maintain or control directionality of driving mechanisms 40. Struts 29a, 29b may be pivoted about respective first pivot points 60a, 60b, which may be in the form of a bolt or pin extending through wheel arm bracket 59, and secured in place with a securement device such as a nut, clevis pin, or the like. Other structures defining pivot points 60a, 60b are of course contemplated by the present invention. Struts 29a, 29b are caused to be pivoted about pivot points 60a, 60b through action of first wheel arm adjustment mechanism 62 that is driven by a fluid pressure operated piston 64 selectively supplied with pressurized fluid through a controlled valve in a pressurized fluid conduit (not shown) that is coupled to a source of pressurized fluid. Piston 64 drives swing arms 66 along drive path 68 through a pivotal coupling between piston 64 and swing arm 66 at connection 70, which may comprise a pin, bolt, or the like extending through swing arms 66 and a portion of piston 64. Other modes of connection of swing arms 66 to piston 64, however, are also contemplated in the present invention. Selective filling of cylinder 65 of piston 64 drives piston rod 64a along direction 71 toward end 69 of drive path 68. In doing so, piston rod 64a drives swing arms 66 along drive path 68, causing them to rotate about pivot connection 70 and respective rear pivots 74, and to correspondingly drive swing brackets 76 generally along direction 71. Because swing brackets 76 are secured to respective struts 29a, force vectors parallel to direction 71 imposed upon struts 29a at the connection between struts 29a and swing brackets 76 result in pivotal rotation of struts 29a about pivot point 60a, which represents a secure pivotal connection between strut 29a and wheel arm bracket 59. Piston rod movement along direction 71 results in pivotal rotation along direction arrows 77, thereby moving wheel arms 28 toward the closed position. Piston rod movement in drive path 68 along an opposite direction 73 correspondingly moves wheel arms 28 toward the open position through an opposite rotational direction about pivot point 60a, 60b.

Drive path 68 may be defined as a channel within a wheel arm adjustment bracket 78. In some embodiments, a centering wheel or bushing (not shown) may be provided at connection 70 to facilitate movement of swing arms 66 along drive path 68, wherein the centering wheel or bushing is adapted to slidably or otherwise engage edges 79 of drive path 68.

Distal end 52a of strut 29a may be pivotally secured to driving mechanism bracket 80 about a first substantially vertical axis 82a. In the illustrated embodiment, strut 29a may include a top bracket 90a and a bottom bracket 90b for pivotal securement at spaced-apart pivot connections 86a, 86b that may be substantially vertically aligned along first axis 82a on driving mechanism bracket 80. Applicant contemplates that a plurality of pivot connection points 86a, 86b may be used to further secure strut 29a to driving mechanism bracket 80, though such plurality of pivot connections 86a, 86b is by no means essential to the operation of wheel arm 28 or driving mechanism 40.

Strut 29b may also be pivotally secured to driving mechanism bracket 80 at one or more pivot connections 88a, 88b which may be substantially vertically aligned with one another along second pivot axis 82b. Such pivotal connections may be made through top and bottom brackets 92a, 92b of strut 29b. As indicated above, however, such multiple point pivotal connection is not required in the present invention.

In one embodiment, both struts 29a, 29b are of fixed length. In addition, driving mechanism bracket 80 may be in a fixed position relative to driving mechanism 40, such that manipulation of driving mechanism bracket 80 correspondingly manipulates the orientation of the respective driving mechanism 40.

In the motion described above wherein fluid pressure operated piston 64 drives piston rod 64a along direction 71 to cause wheel arms 28 to rotate about pivot points 60a along circumaxial direction 77, strut 29b is caused, through its pivotal connection to driving mechanism bracket 80, to rotate about respective pivot point 60b in the same circumaxial direction as the associated strut 29a about pivot point 60a. Due to the fixed length of struts 29a, 29b, and the relative positions of pivot points 60a, 60b, and 86a,b, and 88a,b, struts 29a and 29b operably rotate driving mechanism 40 along a circumaxial direction that is opposite from the circumaxial rotational direction about the respective pivot points 60a, 60b. Such opposite circumaxial direction of rotation about first and second axes 82a, 82b maintains a consistent directionality of driving mechanism 40 with respect to a drive path axis 67. In one embodiment, drive mechanism 40 maintains a directionality throughout the selective adjustment of wheel arms 28 between the open and closed positions that is parallel to drive path axis 67. For the purposes of this application, the "directionality" of the drive mechanisms 40 is considered to be the direction that driving mechanism 40 drives carriage 12.

The selective movement of wheel arms 28 described above selectively moves wheel arms 28 to desired positions between a closed position 6 and an open position 8. In each position of wheel arms 28, a footprint 102 is defined for mobile carriage 12. For the purposes of this application, the term "footprint" shall mean an area within the smallest parallelogram enclosing all of frame 14, wheel arms 28, and driving mechanisms 40, wherein the four-sided parallelogram boundary defines substantially vertical planes at each of the four sides of the four-sided parallelogram. In the closed position 6 of carriage 12 illustrated in FIG. 2, for example, footprint 102 is the product of $W_1$ and $L_1$, with the length dimension "$L_1$" of carriage 12 being defined between the respective outer end surfaces along longitudinal axis 53 of driving mechanism 40. In one embodiment length dimension $L_1$ is about 18 feet, such that footprint 102, with a width dimension $L_1$ of about 3 feet, is about 54 square feet ($L_1 \times W_1$).

Open position 8 of carriage 12 defines a footprint 102 that is the product of width dimension $W_2$ and length dimension $L_2$. In one embodiment, width dimension $W_2$ is about 10 feet, and length dimension $L_2$ is about 15 feet. As such, footprint 102 for open position 8 is about 150 square feet. As evidenced above, footprint 102 in open position 8 is substantially greater than footprint 102 in closed position 6, such that open position 8 provides substantially greater stability for apparatus 10. Open position 8 of carriage 12 is therefore typically utilized when boom 20 is elevated and/or extended for operation.

The spreading mechanism for wheel arms 28 of carriage 12 may employ fluid pressure operated piston 64. In one embodiment, fluid pressure operated piston 64 utilizes between about 500 and 3000 psi of fluid pressure to drive piston rod 64a along drive path 68. In the illustrated embodiment, carriage 12 includes first and second sets 56a, 56b of wheel arms 28, wherein each of sets 56a, 56b include two wheel arms 28a, 28b and 28c, 28d, respectively. In one embodiment, second set 56b of wheel arms 28 selectively adjust between closed and open positions 6, 8 in a manner substantially similar to that described above with respect to first set 56a.

In addition to the features described above, the mechanism for pivoting wheel arms 28 about respective theoretical pivot axes 58a, 58b may be arranged to pivot respective wheel arms 28a-d of first and second sets 56a, 56b simultaneously and at equal rates about respective pivot points 60a, 60b. An advantage of pivoting wheel arms 28a, 28b simultaneously and at equal rates is the predictability and enhanced stability to carriage 12 in selectively adjusting wheel arm spacing. For example, such movement of wheel arms 28 result in the maintenance of an equal spacing of driving mechanisms 40 from drive path axis 67 and/or longitudinal axis 53. Unequal spreading rates of wheel arms 28, by contrast, could introduce instability to carriage 12 in having one or more driving mechanisms 40 closer to drive path axis 67 and/or longitudinal axis 53 than the remaining driving mechanisms within wheel arm sets 56a, 56b. It is contemplated by the present invention, however, that the wheel arm adjustment mechanism 62 may instead employ means for adjusting respective wheel arms 28a, 28b at inequal rates about hypothetical pivot axis 58a. A similar arrangement may be employed for second wheel arm adjustment mechanism 62b. It is also contemplated by the present invention that wheel arms 28a-d of first set 56a may be spread apart independently of second wheel arm set 56b. An advantage of spreading wheel arms 28 of first wheel arm set 56a independent of second set 56b may be to improve the stability of carriage 12 by not having both wheel arm sets 56a, 56b in closed position 6 at the same time.

Figure 6:
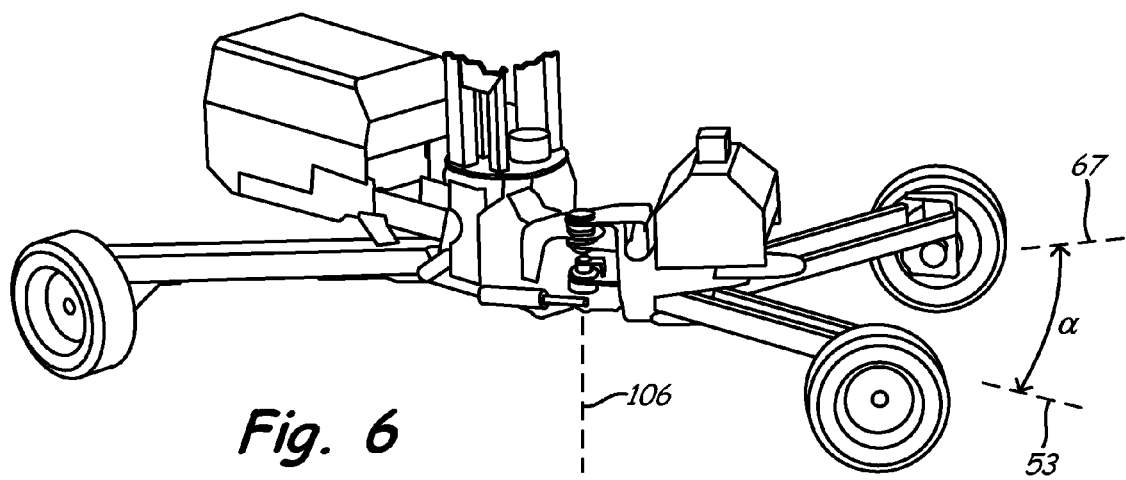
FIG. 6 is a schematic view of a portion of a mobile apparatus of the present invention.
Figure 7:
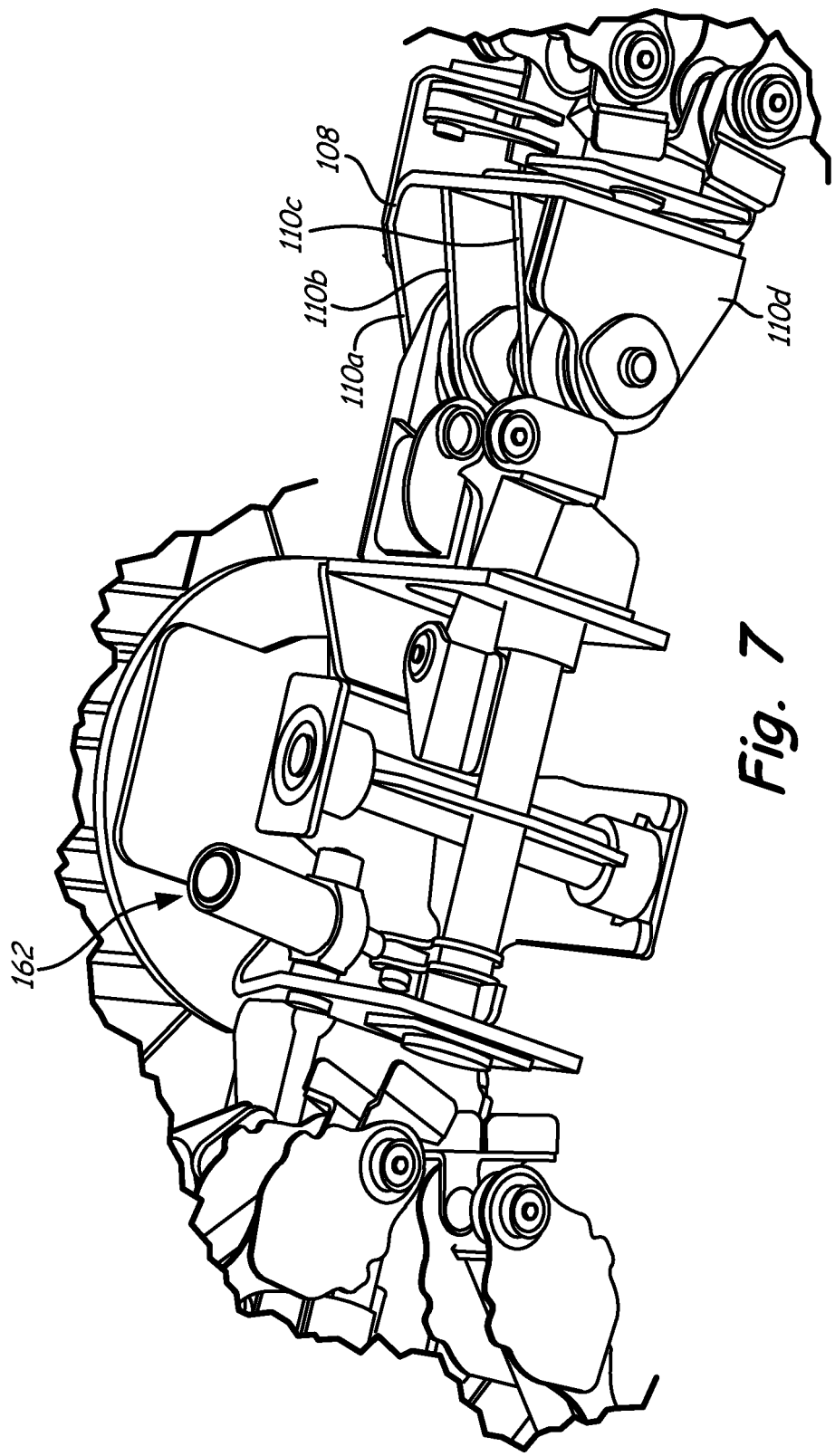
FIG. 7 is an enlarged view of a portion of the mobile apparatus illustrated in FIG. 1.
Figure 9:
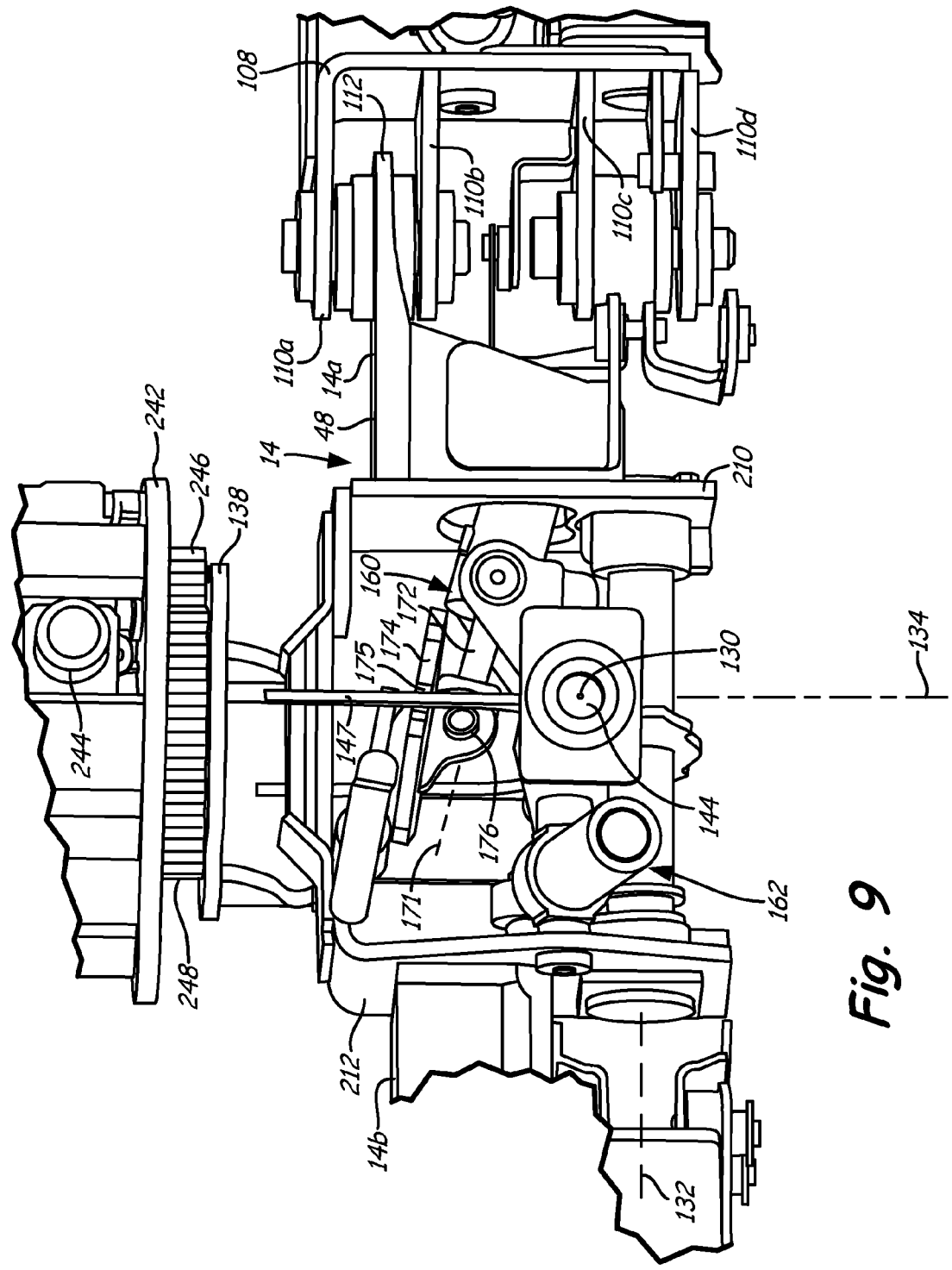
FIG. 9 is an enlarged view of a portion of the mobile apparatus illustrated in FIG. 1.
Figure 10:
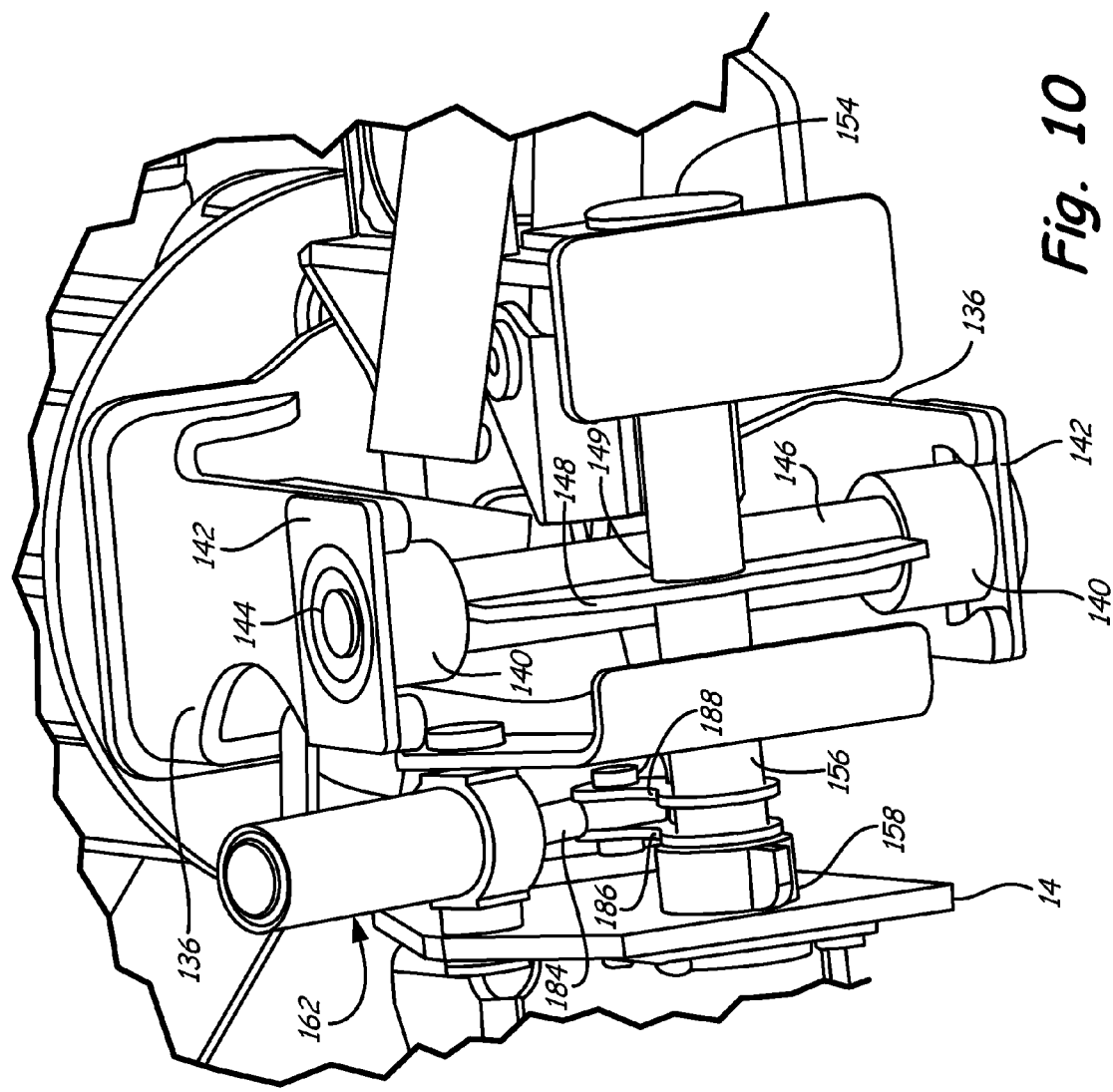
FIG. 10 is an enlarged view of a portion of the mobile apparatus illustrated in FIG. 1.
Figure 11:
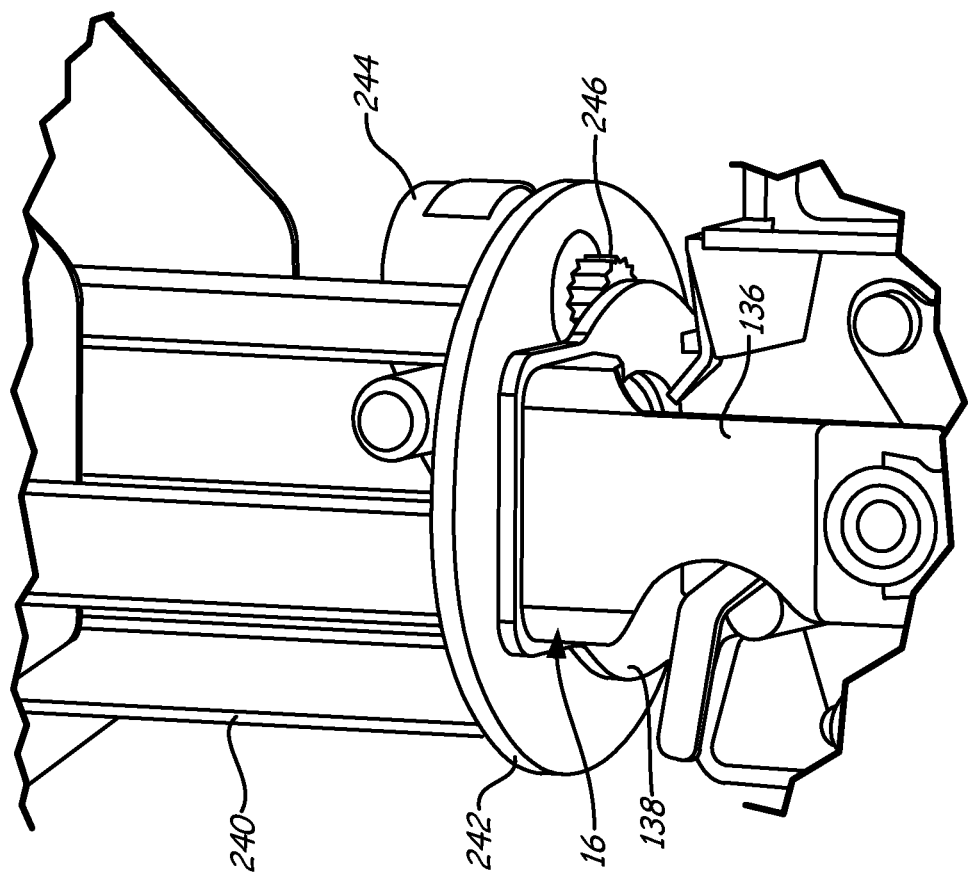
FIG. 11 is an enlarged view of a portion of the mobile apparatus illustrated in FIG. 1.
Figure 12:
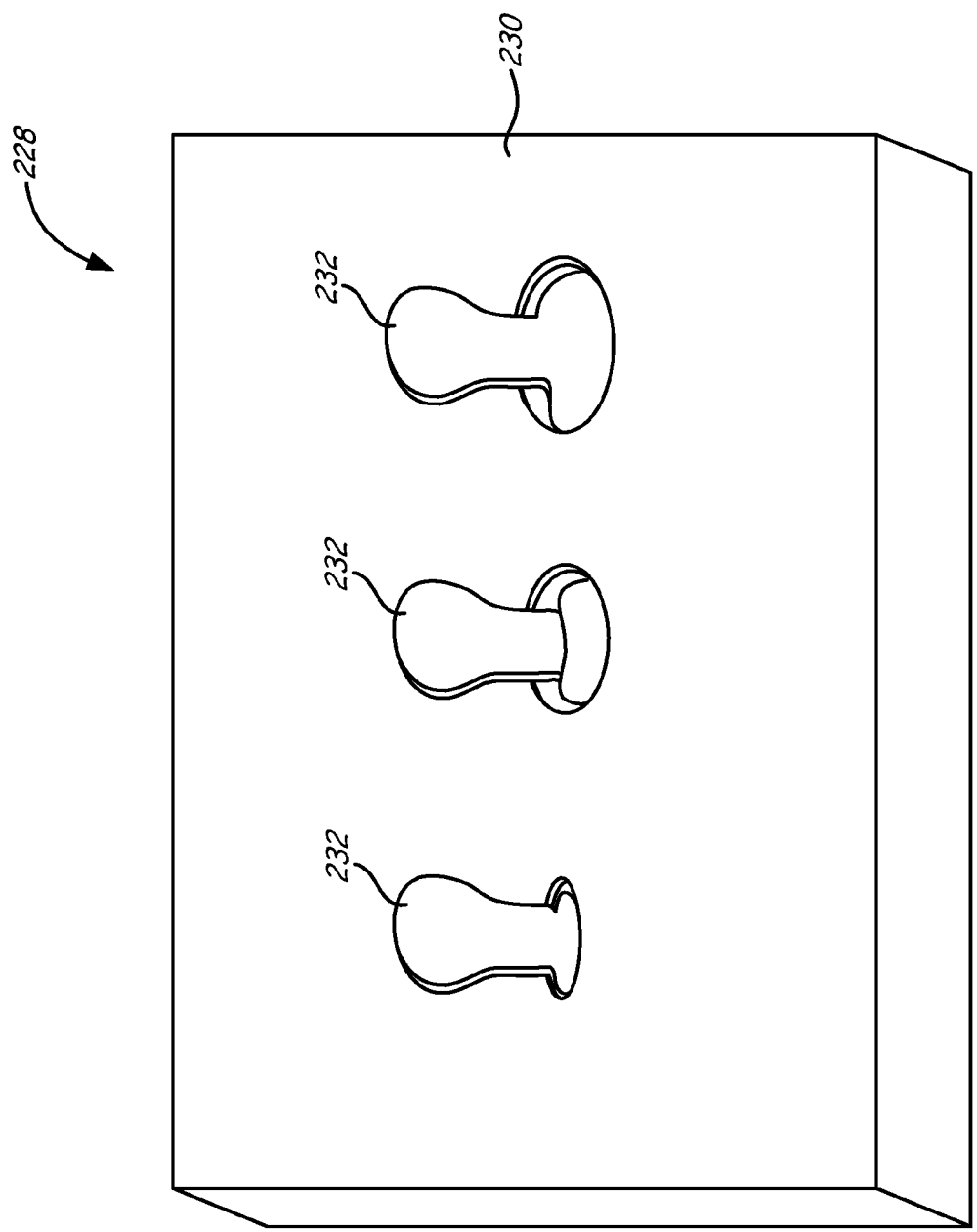
FIG. 12 is a schematic illustration of a control panel for controlling the operation of the mobile apparatus illustrated in FIG. 1.
Figure 13:
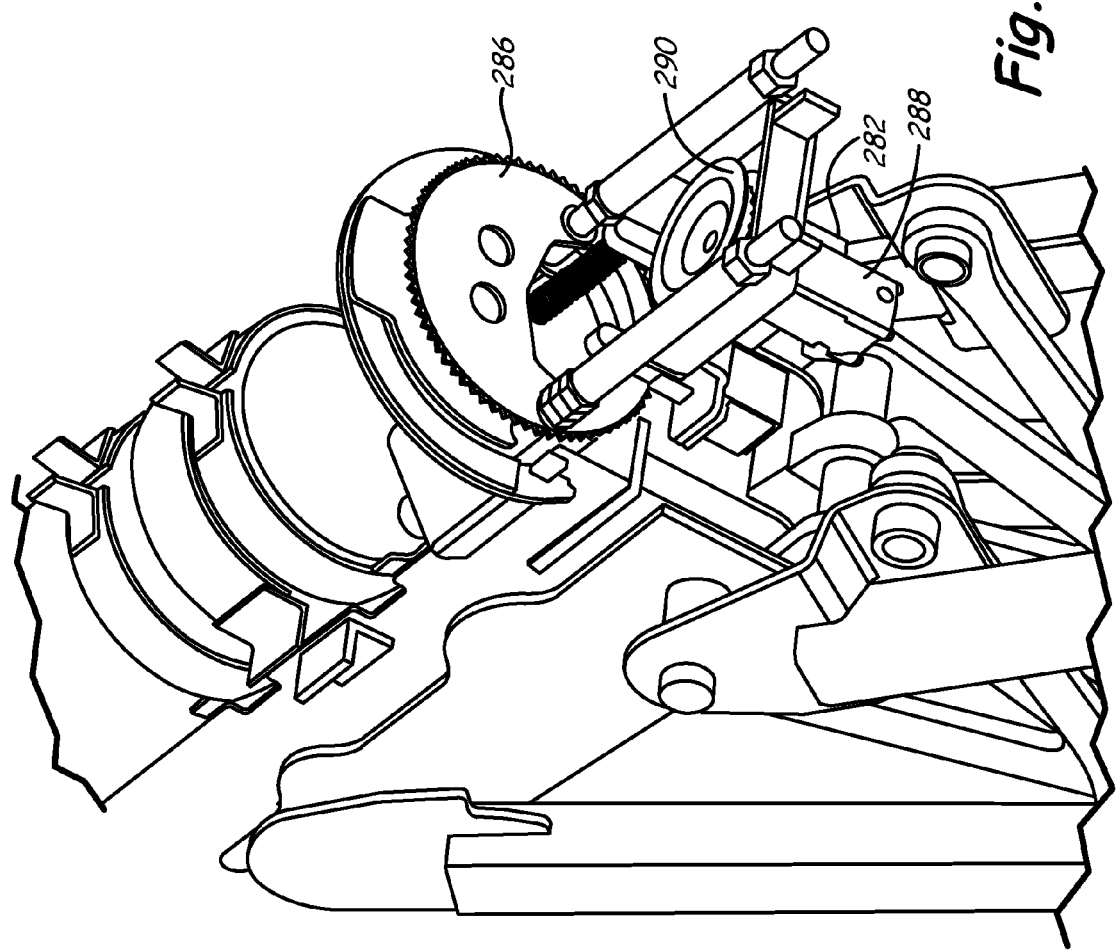
FIG. 13 is an enlarged view of a portion of the mobile apparatus illustrated in FIG. 1.

In another aspect of the present invention, at least one set of wheel arms 56a, 56b may be selectively articulatable about a substantially vertical articulation axis 106 that is spaced from, but substantially parallel to, theoretical first pivot axis 58a of wheel arms 28a, 28b. Such articulation axis 106 enables first set 56a of wheel arms 28 to operably and selectively pivot thereabout, thereby enabling mobile carriage 12 to be selectively steerable. FIG. 6 illustrates mobile carriage 12 with first set 56a being articulated about articulation axis 106 such that drive path axis 68 is angularly offset from longitudinal axis 53. In some embodiments, such angular offset "α" may be up to about 45 degrees. Selective articulation of first set 56a about articulation axis 106 may be performed either or both of clockwise or counter-clockwise about articulation axis 106, such that a full range of articulation of first set 56a may be about α*2. In one embodiment, such range may be about 90 degrees about articulation axis 106.

For the purposes of this application, the term "steerable" shall mean the ability for mobile carriage 12 to be motivated about linear and non-linear paths. To motivate mobile carriage 12 about a non-linear path, first set 56a of wheel arms 28 may be selectively articulated about articulation axis 106, such that drive path axis 67 is angularly offset from longitudinal axis 53. Motivation of driving mechanisms 40 when carriage 12 is so arranged results in a non-linear path of travel.

Articulation axis 106 may be defined at the pivot joint between axle plate 108 and frame 14. Such pivotal coupling supports wheel arm bracket 59, which is secured to axle plate 108 through welding, fasteners, or the like. To facilitate securement to frame 14, axle plate 108 may include a plurality of mounting brackets 110a-d extending integrally therefrom or affixed thereto. In one embodiment, mounting brackets 110a-d are arranged with at least a portion extending substantially horizontally, and presenting an aperture in such horizontal portions through which a pivot pin, axle, or bolt may be positioned. Upper and lower flanges 112, 114 of frame 14 may extend substantially horizontally to be interposed between mounting brackets 110a, 110b and between mounting brackets 110c, 110d, respectively. Such flanges 112, 114 of frame 14 may also include respective apertures which may be vertically aligned along articulation axis 106 with apertures of mounting brackets 110a-d so as to receive one or more pivot pins therethrough. As will be understood in the art, bearings, bushings, washers and the like may be employed at the pivot junction between axle plate 108 and frame 14 to facilitate the pivotal coupling about articulation axis 106.

To selectively articulate front plate 108 about articulation axis 106, apparatus 10 may employ a fluid pressure operated piston 120 having a piston rod 122 coupled to axle plate 108, such as at mounting bracket 110d. Fluid pressure operated piston 120 may be arranged to drive piston rod 122 along piston axis 123 under the force of pressurized fluid supplied to piston 120 through a fluid conduit (not shown) from a pressurized fluid source. Because the connection between piston rod 122 and axle plate 108 is spaced radially from articulation axis 106, movement of piston rod 122 along piston axis 123 effectuates pivotal motion of axle plate 108 about articulation axis 106. In one embodiment, piston 120 may be adapted to supply piston rod 122 with sufficient force to move axle plate 108 about articulation axis 106. Piston 120 may therefore operate with about 1500 psi of pressure fluid.

In some embodiments, driving mechanisms 40 are secured at distal ends 52 of wheel arms 28. In such embodiments, driving mechanisms 40 form the outermost points of mobile carriage 12. While this arrangement may be desirable for the stability afforded to mobile carriage 12, it is also contemplated that at least some of driving mechanisms 40 may be secured inwardly of distal ends 52 of wheel arms 28.

In the illustrated embodiment, driving mechanisms 40 comprise wheels that are each driven by respective fluid pressure operated motors 126. As is understood in the art, such motors are adapted to generate rotational motion that is transmitted to wheels 40 through gears, pulleys, linkages, or the like. Motors 126 may be supplied with pressurized fluid through fluid conduits (not shown), which are supplied from a pressurized fluid source. Motors 126 may be independently controlled by a control mechanism described in greater detail hereinbelow. In this manner, driving mechanisms 40 may be operated at different relative rotational speeds. When travelling along a non-linear path, for example, drive mechanisms 40 on an inner radius may be operated to rotate at a slower rate than the driving mechanisms on the outer radius of the non-linear path. Such modulation of driving mechanism speed can reduce wear on moving parts of driving mechanism 40, and can also reduce damage to the ground surface that can be caused by driving mechanisms which are not so controlled, and must "skid" to some extent when travelling a non-linear path. Though the illustrated embodiment includes motors 126 for each driving mechanism 40, it is contemplated that a single motor may be adapted to motivate the wheels of carriage 12. In addition, it is contemplated that motor types other than fluid-pressure operated motors may be utilized in apparatus 10 of the present invention.

Driving mechanisms 40 may utilize one or more devices to implement motivation to mobile carriage 12. For example, driving mechanisms 40 may employ wheels, tracks, wheel tracks, and combinations thereof in motivating mobile carriage 12. In contrast to conventional systems, the driving mechanisms 40 of the present invention provide both stability and motivation to apparatus 10. For instance, driving mechanisms 40 may provide motivation to mobile carriage 12 in any position between closed position 6 and open position 8, and may be controlled to motivate mobile carriage 12 in both linear and non-linear paths. Conventional devices with relatively small or lightweight support structures have employed deployable outriggers to statically engage the ground surface at locations outboard from the main support structure. Such outriggers, however, provide no mechanism for motivating the device along the ground surface, as is provided in the present apparatus 10. Instead, outriggers have been understood by those of ordinary skill to simply statically engage the ground surface to immobilize the support structure and, in some cases, provide a leveling capability to the support structure. Such outriggers are typically employed in combination with a support structure having its own drive mechanism, such that it would not be readily apparent to provide such outriggers with driving mobility, as such a modification would merely be duplicative of the motivation means already provided in the device.

Pedestal 16 of apparatus 10 may be supported by frame 14, and may be pivotable about first and second substantially horizontal axes 130, 132. In one embodiment, first and second axes 130, 132 are perpendicular to one another and substantially parallel to substantially horizontal plane 49. Through such a pivotal engagement, pedestal 16 may be actuated about a partial spheroid to a desired extent. In one embodiment, pedestal 16 may be tilted up to a 20 degree attitude relative to a vertically-oriented central axis 134. Pedestal 16 includes pedestal arms 136 extending downwardly from pedestal plate 138 and fixedly secured to first horizontal axis housing 140 through mounting plates 142. First axis housing 140 is secured to a first axis pivot pin 144 for operable rotation in unison with pivot pin 144. In such a manner, pedestal arms 136, though mounting plates 142, pivot about first horizontal axis 130 in unison with first axis pivot pin 144. By contrast, first axis sleeve 146 remains stationary about first axis 136, with first axis sleeve 146 being separated from first axis pivot pin 144 through one or more bearings (not shown).

First axis sleeve 146 may be fixedly secured to second axis sleeve 156 through welding, fasteners, or the like. In one embodiment, first axis sleeve 146 includes a connection flange 148 having an aperture 149 disposed therein, and adapted to receive second axis sleeve 156 therethrough. Second axis sleeve 156 may be rotatable about second axis 132 to thereby provide pivotal motion to pedestal 16 through the connection to first axis sleeve 146 and mounting plates 142. Second axis sleeve 156 may be supported by frame 14 at bearing openings 158.

Pivotal motion may be provided about first and second axes 130, 132 by respective first and second pivot mechanisms 160, 162, which may comprise fluid pressure operated pistons. In the illustrated embodiment, first pivot mechanism 160 includes a piston rod 172 to which an actuation plate 174 is secured. In one embodiment, actuation plate 174 may be pivotally secured to piston rod 172 at pivotal connection 176 to pivot about a substantially horizontal axis perpendicular to a piston axis of first pivot mechanism 160. Actuation plate 174 may include a groove or channel 175 which is configured to receive and engage with pivot arms 147 that are secured to first axis housing 140. Consequently, rotational motion about first axis 130 may be delivered to first axis housing through pivot arms 147 which are driven by actuation plate 174 along a piston axis 171. Piston 172 may be extended and retracted along piston axis 171 through the action of pressurized fluid in first pivot mechanism 160.

In like manner to first pivot mechanism 160, second pivot mechanism 162 may comprise a fluid pressure operated piston having a piston rod 184 pivotally coupled to pivot brackets 186 at pivot connection 188. In such a manner, extension and retraction of piston rod 184 imparts rotational motion to pivot brackets 186 about second axis 132. Pivot brackets 186 may be secured to second axis sleeve 156 through welding, fasteners, and the like. Rotational movement about second axis 132 may therefore be communicated to second axis sleeve 156, which, in turn, communicates such rotational motion to first axis sleeve 146 through connection flange 148. Rotational motion about second axis 132 may then be communicated to pedestal arms 136 through mounting brackets 142.

In embodiments wherein first and second pivot mechanisms 160, 162 are fluid pressure operated pistons, pressurized fluid may be supplied thereto through respective fluid conduits supplied by a pressurized fluid source. In other embodiments, however, first and second pivot mechanisms may be driven by means other than fluid pressure operated pistons, such as electric or internal combustion motors. To effectuate pivotal motion of pedestal 16 relative to frame 14, it is contemplated that first and second pivot mechanisms 160, 162 are secured between frame 14 and pedestal 16. In the illustrated embodiment, first and second pivot mechanisms 160, 162 may be indirectly secured between frame 14 and pedestal 16, with a movable portion of pivot mechanisms 160, 162 being secured to structure connected to pedestal 16. Pivot mechanisms 160, 162 are therefore anchored to structure connected to frame 14, such that motion is imparted to pedestal 16 relative to frame 14. The pivotal action of pedestal 16 relative to frame 14 is accomplished either automatically or manually where pedestal 16 is maintained in an orientation relative to the downward vector of the force of gravity. The hydraulic pressures required for pivot mechanism 160, 162 are dependant upon the weight supported by first and second pivot mechanisms 160, 162.

In one aspect of the present invention, first and second axes 130, 132 are located below upper surface 48 of frame 14. Such positioning of first and second axes 130, 132 substantially enhances the overall stability of apparatus 10 and facilitates the operation of apparatus 10 having a mobile carriage 12 with relatively small footprint 102. Moreover, such positioning of first and second axes 130, 132 facilitates a greater extent of pivotal motion of pedestal 16, and consequently boom 20 about central axis 134 without destabilizing apparatus 10, with such pivotal motion to pedestal 16 typically being employed to counteract destabilizing gravitational forces when carriage 12 is on uneven or inclined surfaces. An illustration of such an effect is provided in FIGS. 8A and 8B.

As described above, one aspect of the present invention includes positioning mechanisms 160, 162 low in relation to the remainder of apparatus 10. In one embodiment, first and second axes 130, 132 are positioned at apparatus 10 below substantially horizontal plane 49 containing upper surface 48 of frame 14. Such positioning substantially enhances the stability of apparatus 10, particularly when apparatus 10 is operated on uneven or inclined surfaces. FIGS. 8a and 8b illustrate the beneficial effect on stability that the positioning of first and second axes 130, 132 represent. The positioning of first and second axes 130, 132 is illustrated in FIG. 8*a* as pivot location 180, wherein apparatus 10 is shown schematically on an inclined surface 200. A center of gravity location 182 is further illustrated in FIG. 8*a* as being above pivot location 180, and is schematically representative of the center of gravity of the portions of apparatus 10 pivoted by pivot mechanisms 160, 162 including pedestal 16, boom support 18, and boom 20. FIGS. 8*a* and 8*b* illustrate a specific situation in which center of gravity 182 is pivoted about first and second axes 130, 132 into a position that is substantially vertically aligned above pivot location 180. Without the action of first and second pivot mechanisms 160, 162, center of gravity location 182 would remain at unpivoted location 184 aligned with an axis that is substantially perpendicular to an axle axis 186 of apparatus 10. Gravitational axes 188, 190 represent the axes along which the force of gravity acts upon center of gravity location 182 and unpivoted center of gravity location 184, respectively. First gravitational axis 188, which ideally is coextensive with central axis 134, is monitored such that pivot mechanisms 160, 162 are operated to maintain central axis 134 of pedestal 16 in alignment with a gravitational vector acting upon center of gravity location 182.

In order to facilitate the stable operation of apparatus 10, gravitational axis 188 may intersect ground surface 200 at an intersection point 202 that is within footprint 102 of apparatus 10. Gravitational axis 190 of unpivoted center of gravity location 184 intersects ground surface 200 at second intersection point 204 that is not within footprint 102 of carriage 12. Gravitational axis 190 therefore represents an unstable operating condition for apparatus 10, while the pivoting of pedestal 16, boom support 18, and boom 20 about first and second axes 130, 132 to move the center of gravity of the pivoted portion of apparatus 10 to center of gravity location 182 establishes a stable arrangement for apparatus 10 on inclined surface 200. The relatively low position of pivot location 180, such as below a substantially horizontal plane 49 containing upper surface 48 of frame 14, facilitates an arrangement in which intersection point 202 is within footprint 102 on a variety of inclined surfaces 200. As a result, the relatively low positioning of pivot location 180 enhances the stability of apparatus 10, and enables the operation of apparatus 10 on a variety of surfaces.

A comparison schematic is illustrated in FIG. 8B, which depicts conventional devices having a relatively high pivot location 180. Such an arrangement is common in conventional devices, but limits the utility of the devices on inclined surfaces. As illustrated in FIG. 8B, gravitational axis 189 results in an intersection point 203 that is outside of the footprint of the conventional device 9, even though center of gravity location 182 of apparatus 9 is substantially similar to the center of gravity location 182 in apparatus 10.

Pivot location 180 for apparatus 10 is preferably positioned in order to provide enhanced stability to apparatus 10 for operating on inclined surfaces. In one embodiment, pivot location 180 is positioned such that center of gravity location 182 is positioned so that its associated gravitational axis 188 intersects surface plane 200 within a footprint of apparatus 10. With reference to FIG. 8*a*, such an arrangement is illustrated by intersection point 202 being disposed within footprint 102, and particularly within width dimension $D_1$. By maintaining intersection point 202 within width dimension $D_1$, the moment about the downhill wheel 40 created by the weight of center of gravity 182 is directed "uphill", thereby stabilizing apparatus 10. Second intersection point 204 of gravitational axis 190, for example, causes a moment about the downhill wheels 40 oriented in a "downhill" direction, thereby destabilizing apparatus 10. Therefore, it is an important aspect of apparatus 10 to maintain intersection point 202 within width dimension $D_1$, as measured between intersection point 205 and an outer contact edge of wheels 40 contacting surface plane 200 at a perimeter boundary of footprint 102.

As illustrated in FIG. 8*a*, dimension $D_2$ is the perpendicular distance from plane 200 to pivot location 180, defined as the uppermost pivot axis for pivoting pedestal 16 about central axis 134, as described above. Dimension $D_3$ is the distance along plane 200 between intersection point 205 and intersection point 202. The alignment control system for controlling pivot mechanisms 160, 162 may, in some embodiments, exhibit a tolerance range for maintaining gravitational axis 188 extending through pivot location 180. In one embodiment, a tolerance range for such control mechanism is +/− one degree from vertical. At Δ=one degree from vertical, center of gravity location 182 is effectively shifted to position 182*a*, resulting in a gravitational axis 188*a* that is shifted from gravitational axis 188 by a dimension $D_5$ to establish a tolerance intersection point 206 with plane 200. The tolerance of the control system may be considered in determining the positioning of pivot location 180 and the center of gravity location 182, and particularly the relative positionings thereof, as demonstrated by dimension $D_7$. Dimension $D_6$ indicates the distance along plane 200 between intersection point 202 and intersection point 206.

Applicants have determined a relationship among pivot location 180 and center of gravity location 182 which facilitates the operation of apparatus 10 on inclined surfaces 200 without the need for outriggers or other stability enhancement devices. Width dimension $D_3$, separation dimension $D_7$ (the straight line distance from pivot location 180 to center of gravity location 182), and slope angle β, are pre-determined based upon the design of apparatus 10 and the slope of inclined surface 200. The following relationship, in one embodiment, may be determinative of the positioning of pivot location 180 with respect to center of gravity location 182:

$$D_4 \times \sin(\beta) + D_6 < D_1$$

Where: $D_4 = \mathrm{SQRT}(D_2^2 + D_3^2)$
$D_5 = D_7 \times \sin(\Delta)$
$D_6 = D_5 \div \cos(\beta)$ In another aspect, pivot location 180, as measured to the uppermost one of pivot axes 130, 132, has a dimension "$D_2$" that is not greater than about 36 inches.

The desirable positioning of pivot location 180 described above has been accomplished in apparatus 10 by dividing frame 14 into first and second portions 14*a*, 14*b*, between which first and second pivot mechanisms 160, 162 are disposed. It is also contemplated, however, that frame 14 may remain undivided, with first and second pivot mechanisms 160, 162 being positioned therebelow. In the illustrated embodiment, frame support plates 210, 212 are secured to frame portions 14*a*, 14*b*, respectively, and therefore form a "cage" in which first and second pivot mechanisms 160, 162 may be disposed to together define a pivot location 180. As described above, pivot mechanisms 160, 162 are anchored to frame 14, and transmit pivotal motion to pedestal 16. Conventional systems, by contrast, simply position pivot location 180 above frame 14, such that complex support structures for pivot mechanisms 160, 162 need not be engineered. In this case, the enhancement to stability of apparatus 10 is a substantial benefit which outweighs the challenge and expense of engineering a structure to accommodate the desirably low pivot location 180.

Apparatus 10 has been described herein as being operated primarily through fluid pressure operated mechanisms. To supply such mechanisms with pressurized fluid, a fluid pump 214 may be employed to pressurize fluid to a range of about 500 to 4000 psi. In some embodiments, the pressurized fluid may be a hydraulic oil, such as ISO 46. An engine 216 may be employed by apparatus 10 to drive fluid pump 214. An example engine 216 may be an internal combustion engine available from Deutz Corporation having 46 horsepower. It is also contemplated that a plurality of fluid pumps 214 may be utilized in apparatus 10 to supply the various pressurized fluid operated mechanisms with an adequate supply of sufficiently pressurized fluid.

Apparatus 10 may include a first control system 220 for automatically operating first and second pivot mechanisms 160, 162 in selectively pivoting pedestal 16 about first and second axes 130, 132. First control system 220 includes software communicatively coupled to a data processor, which is itself communicatively coupled to one or more sensors detecting an orientation of central axis 134 of pedestal 16 in relation to a gravitational vector, wherein such communicative coupling is facilitated through a feedback signal generator for delivering to the data processor a detection signal from the positional sensor to the data processor. First control system 220 further includes an output signal generator for delivering a control signal to respective valves, such as solenoid valves 222 to regulate fluid flow through fluid supply conduits coupled to associated fluid pressure operated mechanisms of apparatus 10. Valves 222 may be other than solenoid valves, as desired per application.

First control system 220 may be sourced as a commercial product available from Parker Hannifin Corporation under the trade name IQAN.

First control system 220 may be programmed to automatically maintain central axis 134 of pedestal 16 substantially in alignment with gravitational vector 208 acting upon the center of gravity of structure pivoted by first and second pivot mechanisms 160, 162. To maintain such alignment, first control system 220 receives feedback signals from the sensor indicating any displacement of central axis 134 from gravitational axis 188. A displacement signal to first control system 220 causes the software to operate the output signal generator to deliver a control signal to one or more respective valves 222 regulating fluid flow to one or more of first and second pivot mechanisms 160, 162. Accordingly, first control system 220 controllably operates first and second pivot mechanisms 160, 162 to selectively adjust the orientation of pedestal 16 about first and second substantially horizontal axes 130, 132, such that central axis 134 re-establishes alignment with gravitational axis 188. The control of first and second pivot mechanisms 160, 162 is preferably automated through, for example, a PID control scheme, such that any detected deviation between central axis 134 and the gravitational vector 208 along gravitational axis 188 automatically drives one or more of first and second pivot mechanisms 160, 162 in a manner appropriate to realign central axis 164 with gravitational axis 188.

Apparatus 10 may include a second control mechanism 228 for controlling the motion of mobile carriage 12, wheel arms 28, pedestal 16 about central axis 134, boom support 18, boom 20, and cutting apparatus 26. Second control mechanism 228 may be manually operated to deliver electrical signals to valves 222 regulating pressurized fluid flow to the associated pressurized fluid operated motors and pistons driving the respective motion of the above-described elements of apparatus 10. In this regard, the generation, transmission, and reception of control signals from second control mechanism 228 are well understood by those of ordinary skill in the art. Some of the control operations of second control mechanism 228 are described in, for example, U.S. Pat. No. 4,411,070.

Second control mechanism 228 preferably controls the operation of driving mechanisms 40, wheel arms 28 about first and second pivot axes 58a, 58b, wheel arms 28a, 28b about articulation axis 106, boom support 18 about central axis 134 and about the respective boom support pivot axes, boom 20 both along and about a boom axis 280, and the operation of cutting apparatus 26. In one embodiment, second control mechanism 228 is manually operated to deliver electrical signals to associated valves 222 in a hydraulically-driven system. In other embodiments, however, second control mechanism 228 may be manually operated to deliver signals to electrical motors and the like. In one embodiment, second control mechanism 228 may deliver signals to apparatus 10 wirelessly, and may effectively control apparatus 10 remotely. In this embodiment, second control mechanism 228 may comprise a remote control panel 230 including one or more control levers 232 for selective manipulation by an operator of apparatus 10. Remote control panel 230 may be of a size and weight to be easily carried by a human user, and may effectively transmit signals to apparatus 10 from a distance of up to fifty feet or greater. In this manner, the operator may remotely control the operation of apparatus 10 from a safe distance away from falling tree limbs cut by apparatus 10. This arrangement further reduces the expense of apparatus 10, by eliminating the requirement of a secured operator's cabin supported by carriage 12.

Boom support 18 includes an upright 240 extending upwardly from a boom support plate 242. As described above, boom support 18 is rotatably secured to pedestal 16 for selective rotation about central axis 134. To effectuate such selective rotation, a boom support motor 244 is secured to boom support plate 242, which motor includes a drive shaft extending through boom support plate 242 and terminating in a drive gear 246 which operably intermeshes with a spline plate 248 fixedly secured to pedestal plate 138. In this manner, rotational output from boom support motor 244 delivered to drive gear 246 causes drive gear 246 to move circumaxially about central axis 134 while in intermeshing engagement with spline plate 248. To maintain connection between boom support 18 and pedestal 16, a flanged bushing or the like may be rotatably secured between boom support plate 242 and spline plate 248. Other modes and mechanisms for rotatable connection between boom support plate 242 and pedestal plate 148 through spline plate 248 are contemplated as being useful in the present invention, and are well understood by those of ordinary skill in the art.

Boom support motor 244, in some embodiments, may be a fluid pressure operated motor arranged to supply rotational motion to drive gear 246 about an axis substantially parallel to central axis 134. Boom support motor 244 may be supplied with pressurized fluid through respective fluid conduits coupled to fluid pump 214. Boom support motor 244 may be controllably operated by second control mechanism 228, as described above. In such a manner, the operator may remotely control boom support motor 244 to selectively rotate boom support 18 about a reference axis 185 that is normal to axle axis 180 central axis 134.

In addition to being rotatable about central axis 134, boom support 18 may be selectively pivotable about first and second sets of boom support pivot axes 250a, 250b and 252a, 252b. First and second sets of boom support pivot axes may each include one or more pivot axes arranged substantially perpendicular to central axis 134. In the illustrated embodiment, first and second sets of boom support pivot axes each include two pivot axes about which first and second boom support pivot arms 254a, 254b operably pivot. First and second set of boom support pivot axes 250a, 250b and 252a, 252b may be respectively defined by pivot pins rotatably securing first and second boom support pivot arms 254a, 254b to respective brackets of boom support 18. In such a manner, first and second boom support pivot arms 254a, 254b may be operably pivoted about first and second set of boom support pivot axes 250a, 250b and 252a, 252b to selectively extend between a stowage condition 256 and an operating condition 258.

To selectively pivot first and second boom support pivot arms 254a, 254b about their respective pivot axes, boom support 18 may include one or more fluid pressure operated pistons, as is well known in the art. One mechanism for operably extending and retracting first and second boom support pivot arms 254a, 254b is described in U.S. Pat. No. 4,411,070.

With boom support 18 being movable up to 360 degrees around reference axis 185, and being pivotable about first and second sets of boom support pivot axes 250a.

250b and 252a, 252b, boom support 18 may operably position boom 20 into a wide variety of positions and orientations. Stowage condition 256 of boom support 18, in which boom 20 rests upon cradle 30, establishes a relatively compact configuration for apparatus 10, and lowers the center of gravity of the combination of boom support 18, boom 20, and cutting apparatus 26 to a point wherein apparatus 10 may be stably operated with wheel arms 28 in a closed position, as is illustrated in FIG. 2. Operating condition 258 of boom support 18, as illustrated in FIG. 1, substantially elevates boom 20 and cutting apparatus 26 above carriage 12 in order to reach canopy vegetation such as tree limbs and the like. In one embodiment, first and second boom support pivot arms 254a, 254b are selectively moveable from a substantially horizontal orientation in stowage condition 256 to a substantially vertical orientation in operating condition 258. Of course, it is to be understood that apparatus 10, including cutting apparatus 26, may be operated while boom support 18 is in any position between stowage condition 256 and operating condition 258. First and second boom support pivot arms 254a, 254b may have respective lengths $L_3$, $L_4$ of between about three and ten feet, though other lengths are also contemplated as being useful in apparatus 10 of the present invention. Consequently, first and second boom support pivot arms 254a, 254b may be operated to elevate a proximal end 260 of boom support 18 by a comparable dimension in pivoting between a substantially horizontal orientation to a substantially vertical orientation in the operating condition 258. In similar fashion to that described above with respect to spaced apart struts 29a, 29b of wheel arm 28a each having respective pivot axes 82a, 82b at driving mechanism bracket 80 for pivoting driving mechanism 40 simultaneously with pivoting about respective pivot points 60a, 60b, first and second boom support pivot arms 254a, 254b operably pivot about the spaced apart second set of boom support pivot axes 252a, 252b to cause boom bracket 262 to pivot upwardly or downwardly while first and second boom support pivot arms 254a, 254b are pivoted between stowage condition 256 and operating condition 258. In the illustrated embodiment, movement of first and second boom support pivot arms 254a, 254b toward operating condition 258 causes boom bracket 262 to rotate clockwise with respect to second set of boom support pivot axes 252a, 252b. While such pivotal motion is taking place, the relative positions and lengths of first and second boom support pivot arms 254a, 254b cause distal end 264 of boom bracket 262 to increase elevation with respect to proximal end 260, thereby lifting distal end 24 of boom 20. Opposite pivotal movement of first and second boom support pivot arms 254a, 254b causes distal end 264 of boom bracket 262 to descend with respect to proximal end 260, such that distal end 24 of boom 20 descends toward cradle 30. In one embodiment, boom support 18 in operating condition 258 elevates boom 20 to an angle "β" of between about 45 and 80 degrees. It is to be understood, however, that various arrangements of boom support 18, and particularly first and second boom support pivot arms 254a, 254b, may provide different maximum elevational angles "β". It is also to be understood that various methods and mechanisms may be employed to elevate and/or pivot boom 20 with respect to carriage 12, and that the specific mechanism described and illustrated herein is merely exemplary.

In one embodiment, proximal end 22 of boom 20 may be secured to boom bracket 262 through one or more straps 268, which wrap about a portion of boom 20 and are secured to boom bracket 262. The securement of boom 20 to boom bracket 262 may be such that boom 20 may be rotatable about a longitudinal boom axis 280 while secured to boom bracket 262 of boom support 18. In particular, the frictional resistance to rotation of boom 20 about boom axis 280 generated in the securement of straps 268 about proximal end 22 of boom 20 is preferably of a magnitude that may be overcome in the driven rotation of boom 20 about axis 280. To facilitate a secure attachment of boom 20 to boom bracket 262, straps 268 include at least an inner surface in contact with boom 20 that exhibits a relatively low surface friction. Example such materials include various polymeric materials, such as Teflon, ultra high molecular weight polyethylene, high density polyethylene, high density polypropylene, and the like. Straps 268 may be secured to respective strap brackets 269 at boom bracket 262.

Boom 20 may be rotated about longitudinal axis 280 through operation of a boom rotation motor 282 adapted to provide rotational output to drive wheel 284, which may be in the form of a toothed sprocket. A drive chain or belt (not shown) may couple drive wheel 284 to fly wheel 286 to transmit rotation of drive wheel 284 to fly wheel 286. As is understood in the art, drive wheel 284 may be substantially smaller in diameter than fly wheel 286 in order to reduce the torque necessary for boom rotation motor 282 to rotate boom 20 about boom axis 280. In one embodiment, the tooth count ratio of fly wheel 286 to drive wheel 284 may be about 20:1. Fly wheel 286 may be secured to proximal end 22 of boom 20, such that rotational motion of fly wheel 286, as driven by drive wheel 284, is translated to boom 20 to rotate about boom axis 280. In one embodiment, boom rotation motor 282 may be adapted to provide rotation to fly wheel 286 at least 180 degrees about boom axis 280. Boom rotation motor 282 may be hydraulic, electric, or the like and may be selectively reversible to provide both clockwise and counterclockwise rotation to fly wheel 286 about boom axis 280.

In the illustrated embodiment, distal end 24 of boom 20 is telescopically received in proximal end 22, with the telescoping relationship being along boom axis 280. Distal end 24 may be coupled to proximal end 22 of boom 20 in a manner to prevent relative rotation therebetween. Consequently, rotation imparted by boom rotation motor 282 to proximal end 22 of boom 20 may be transferred to distal end 24, such that distal end 24 and proximal end 22 may operably rotate about boom axis 280 in unison.

Boom retracting and extending movements are imparted by way of a boom telescoping motor 288, which is secured to boom support 18. In some embodiments, boom telescoping motor 288 may be a pressurized fluid operated motor. A sprocket 290 is attached to the end of the shaft of boom telescoping motor 288. Sprocket 290 engages a length of chain, which is affixed at one end to distal end 24 of boom 20, and at another end to proximal end 22. In similar fashion to that described in U.S. Pat. No. 4,411,070, operation of boom telescoping motor 288 in a first rotational direction causes distal end 24 to move outwardly from within proximal end 22. On the other hand, if boom telescoping motor 288 is caused to operate in the opposite direction, distal end 24 is caused to retract into proximal end 22 of boom 20.

Mounted at the end of distal end 24 of boom 20 is cutting apparatus 26. In one embodiment, cutting apparatus 26 includes a circular saw 302 that is powered by a motor, such as a hydraulic motor supplied with fluid under pressure by pump 214. A saw guard 304 is provided to help eliminate the possibility of debris being thrown backward toward the remainder of apparatus 10. Cutting apparatus 26 is mounted to distal end 24 through a mounting bracket 306, which is secured to distal end 24 through fasteners or the like to affix mounting bracket 306 to boom 20. In one embodiment, cutting apparatus 26 is fixedly secured with respect to boom 20, such that rotation of boom 20 about boom axis 280 correspondingly rotates cutting apparatus 26 in unison therewith. In this arrangement, therefore, gearing and electrical lines typically needed for conventional apparatus may be deleted from present apparatus 10. Such deletion significantly reduces the weight of boom 20, and eliminates an electrical conduction pathway between cutting apparatus 26 and boom support 18. Conventional cutting apparatus typically involve rotation of the cutting device with respect to the boom. By imparting rotation to the boom itself, apparatus 10 simplifies construction and eliminates weight and electrical conduction pathways along boom 20. Rotation of cutting apparatus 26 about boom axis 280, therefore, is effectuated through operation of boom rotation motor 282 at proximal end 22 of boom 20, as described above. Circular saw 302 is driven about saw axis 308 by a motor, such as a high speed hydraulic motor. The saw blade motor may be secured to distal end 24 about an axis perpendicular to, and at the same elevation as, boom axis 280. Circular saw 302 is secured to a rotating shaft of the saw blade motor by means of a hub and locking nut.

The invention has been described herein in considerable detail in order to comply with the patent statutes and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A tree trimming apparatus, comprising:
   a mobile carriage comprising a frame;
   first and second sets of wheel arms secured to said frame, said first set having first and second wheel arms being selectively articulatable about a first vertical articulation axis;
   driving mechanisms coupled to respective said wheel arms for motivating said mobile carriage, wherein articulation of said first set of wheel arms about said first articulation axis modifies a spacing dimension between said respective driving mechanisms of said first and second wheel arms;
   a pedestal supported by said frame, said pedestal being pivotable about first and second substantially horizontal axes, wherein said first and second axes are located in respective parallel planes and below a substantially horizontal plane containing an upper surface of said frame;
   a first pivot mechanism for selectively pivoting said pedestal about said first substantially horizontal axis, and a second pivot mechanism for selectively pivoting said pedestal about said second substantially horizontal axis;
   a boom support secured to said pedestal;
   a boom having a proximal end and a distal end, said proximal end being secured to said boom support; and
   a cutting apparatus secured to said distal end of said boom.

2. A tree trimming apparatus as in claim 1, wherein said first pivot mechanism includes a first fluid pressure operated piston secured between said frame and said pedestal, and said second pivot mechanism includes a second fluid pressure operated piston secured between said frame and said pedestal.

3. A tree trimming apparatus as in claim 2, including a fluid pump for supplying said first and second pistons with pressurized fluid through respective fluid supply conduits.

4. A tree trimming apparatus as in claim 3, including a control system for automatically operating said first and second pivot mechanisms, said control system comprising: (i) one or more sensors configured to detect an orientation of a central axis of said pedestal in relation to a gravitational vector, (ii) a data processor, (iii) a feedback signal generator for delivering a detection signal from said one or more sensors to said data processor, and (iv) an output signal generator for delivering a control signal to respective valves to regulate fluid flow through said fluid supply conduits.

5. A tree trimming apparatus as in claim 4 wherein said control system is programmed to automatically maintain said central axis of said pedestal within an offset tolerance angle from said gravitational vector by operating said first and second pivot mechanisms to accordingly adjust said pedestal orientation about said first and second substantially horizontal axes.

6. A tree trimming apparatus as in claim 4 wherein said boom support is rotatably secured to said pedestal for selective rotation about said central axis.

7. A tree trimming apparatus, comprising:
   a mobile carriage comprising a frame and wheel arms secured to said frame, said wheel arms supporting driving mechanisms for motivating said mobile carriage, wherein said driving mechanisms are drivably secured to respective distal ends of said wheel arms, and wherein at least first and second ones of said wheel arms are selectively articulatable relative to one another and about a first vertical pivot axis between a first closed position and a second open position, said frame, said wheel arms, and said driving mechanisms together defining a footprint for said mobile carriage, said footprint having a first length and a first width for said first closed position, and a second length and a second width for said second open position, said first width being no greater than about 35 inches;

a pedestal supported by said frame, said pedestal being selectively pivotable about first and second substantially horizontal axes;

a boom support rotatably secured to said pedestal for selective rotation about a substantially vertical central axis of said pedestal;

a boom having a proximal end and a distal end, said proximal end being secured to said boom support; and a cutting apparatus secured to said distal end of said boom.

8. A tree trimming apparatus as in claim 7 wherein said driving mechanisms comprise wheels driven by respective fluid pressure operated motors operably coupled to wheels.

9. A tree trimming apparatus as in claim 7, including third and fourth ones of said wheel arms articulatable relative to one another and about a second vertical pivot axis.

10. A tree trimming apparatus as in claim 9 wherein said first and second ones of said wheel arms are simultaneously pivotable at equal rates in opposite circumaxial directions about said first pivot axis.

11. A tree trimming apparatus as in claim 7 wherein said second width is at least about eight feet.

12. A tree trimming apparatus, comprising:

a mobile carriage comprising a frame;

a pedestal supported by said frame, said pedestal being selectively pivotable about first and second substantially horizontal axes;

a boom support rotatably secured to said pedestal for selective rotation about a substantially vertical central axis of said pedestal;

a boom having a proximal portion and a distal portion, with a longitudinal axis extending along a length of said boom defined as from said proximal to said distal portion, said proximal portion being directly secured to said boom support, and said distal portion being connected to said proximal portion in a manner to prevent relative rotation with respect to each other about the longitudinal axis;

a first motor directly secured to said boom support and coupled to said proximal portion of said boom to selectively rotate said proximal portion of said boom with respect to said boom support about the longitudinal axis of said boom, wherein rotation of said proximal portion about the longitudinal axis correspondingly rotates said distal portion; and a cutting apparatus secured to said distal portion of said boom so as to rotate in unison with said boom about said longitudinal axis.

13. A tree trimming apparatus as in claim 12 wherein said boom is secured to said boom support by one or more straps attached to said boom support, with said securement of said straps to said boom generating a frictional resistance force in rotation of said boom with respect to said straps, which frictional resistance force is overcome by a rotational force generated by said motor.

* * * * *